United States Patent
Wallentin et al.

(10) Patent No.: US 12,047,805 B2
(45) Date of Patent: Jul. 23, 2024

(54) METHOD AND NODE FOR DETERMINING PRIORITY OF DATA FROM A SCHEDULING ASSIGNMENT

(71) Applicant: TELEFONAKTIEBOLAGET LM ERICSSON (PUBL), Stockholm (SE)

(72) Inventors: Pontus Wallentin, Linköping (SE); Paul Schliwa-Bertling, Ljungsbro (SE); Johnny Karout, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 17/175,783

(22) Filed: Feb. 15, 2021

(65) Prior Publication Data

US 2021/0211923 A1    Jul. 8, 2021

Related U.S. Application Data

(62) Division of application No. 16/085,420, filed as application No. PCT/IB2017/051475 on Mar. 14, 2017, now Pat. No. 10,952,093.

(Continued)

(51) Int. Cl.
| | |
|---|---|
| *H04W 28/02* | (2009.01) |
| *H04L 47/2475* | (2022.01) |
| *H04W 4/40* | (2018.01) |
| *H04W 40/12* | (2009.01) |
| *H04W 72/12* | (2023.01) |

(Continued)

(52) U.S. Cl.
CPC ..... *H04W 28/0263* (2013.01); *H04L 47/2475* (2013.01); *H04W 4/40* (2018.02); *H04W 28/0268* (2013.01); *H04W 28/0278* (2013.01); *H04W 40/12* (2013.01); *H04W 72/12* (2013.01);

(Continued)

(58) Field of Classification Search
CPC ............ H04W 28/0263; H04W 4/40; H04W 28/0268; H04W 28/0278; H04W 40/12; H04W 72/12; H04W 72/1236; H04W 84/005; H04W 72/543; H04L 47/2475
See application file for complete search history.

(56) References Cited

U.S. PATENT DOCUMENTS

| | | |
|---|---|---|
| 6,578,077 B1 | 6/2003 | Rakoshitz |
| 2007/0156905 A1 | 7/2007 | Chen |

(Continued)

FOREIGN PATENT DOCUMENTS

| | | |
|---|---|---|
| WO | 2007121686 A1 | 11/2007 |
| WO | 2014011008 A1 | 1/2014 |

(Continued)

OTHER PUBLICATIONS

English Translation of WO-2016120693-A1, retreived from PE2E Search on Sep. 22, 2022. (Year: 2016).*

(Continued)

*Primary Examiner* — Omar J Ghowrwal
(74) *Attorney, Agent, or Firm* — Sage Patent Group

(57) ABSTRACT

According to certain embodiments, a method by a wireless device is provided for mapping of application data packets onto bearers. The method includes associating at least one tag value with a bearer upon establishment of the bearer. A tag is attached to a packet when passing the packet to a lower layer. The packet is mapped onto the bearer, and a path to transmit the packet is selected.

6 Claims, 18 Drawing Sheets

Related U.S. Application Data

(60) Provisional application No. 62/308,387, filed on Mar. 15, 2016.

(51) Int. Cl.
 *H04W 72/543* (2023.01)
 *H04W 84/00* (2009.01)

(52) U.S. Cl.
 CPC ....... *H04W 72/543* (2023.01); *H04W 84/005* (2013.01)

(56) References Cited

U.S. PATENT DOCUMENTS

| | | | |
|---|---|---|---|
| 2007/0223491 | A1 | 9/2007 | Baek |
| 2008/0123660 | A1 | 5/2008 | Sammour |
| 2008/0132269 | A1 | 6/2008 | Shen |
| 2010/0309926 | A1 | 12/2010 | Sun |
| 2011/0035495 | A1 | 2/2011 | Ekstrom |
| 2015/0099506 | A1 | 4/2015 | Iwai |
| 2015/0117347 | A1 | 4/2015 | Iwai |
| 2016/0353318 | A1 | 12/2016 | Liu |
| 2017/0006622 | A1* | 1/2017 | Baghel ............... H04W 72/0413 |
| 2017/0374677 | A1* | 12/2017 | Lee ....................... H04W 72/02 |
| 2018/0191551 | A1 | 7/2018 | Chun |
| 2018/0206089 | A1 | 7/2018 | Cavalcanti |
| 2019/0014490 | A1* | 1/2019 | Kim ....................... H04W 88/04 |
| 2019/0021019 | A1 | 1/2019 | Seo |

FOREIGN PATENT DOCUMENTS

| | | | | |
|---|---|---|---|---|
| WO | WO-2016106686 A1 * | 7/2016 | | |
| WO | WO-2016120693 A1 * | 8/2016 | ............ | H04W 28/24 |

OTHER PUBLICATIONS

ETSI TR 121 905 V14.1.1, Digital cellular telecommunications system (Phase 2+) (GSM); Universal Mobile Telecommunications System (UMTS); LTE; Vocabulary for 3GPP Specifications [online], Jul. 2017 [retrieved on Feb. 10, 2023], Retrieved from the Internet: <URL: https://www.etsi.org/deliver/etsi_tr/121900_121999/121905/14.01.01_60/tr_121905v140101p.pdf> (Year: 2017).*

Ericsson, QoS enhancements for V2X including non-IP data, SA WG2 Meeting #114, Sophia Antipolis, FR, S2-161580, Apr. 11-15, 2016.

Ericsson, QoS enhancements for sidelink and Uu, 3GPP TSG-RAN WG2 #93bis, Dubrovnik, Croatia, Tdoc R2-162817, Apr. 11-15, 2016.

Ericsson, Traffic Management in V2X, 3GPP TSG-RAN WG2 #93bis, Dubrovnik, Croatia, Tdoc R2-162820, Apr. 11-15, 2016.

* cited by examiner

METHOD AND NODE FOR DETERMINING PRIORITY OF DATA FROM A SCHEDULING ASSIGNMENT

PRIORITY

This application is a division of U.S. application Ser. No. 16/085,420, filed Sep. 14, 2018, which is a 371 of International Application No. PCT/IB2017/051475, filed Mar. 14, 2017, which claims priority to U.S. Patent Provisional Application No. 62/308,387, filed on Mar. 15, 2016, the disclosure of which is hereby incorporated by reference.

TECHNICAL FIELD

The present disclosure relates, in general, to wireless communications and, more particularly, systems and methods for quality of service (QoS) differentiation for non-IP bearers.

BACKGROUND

The interest in vehicular communications, also known as Intelligent Transport Systems (ITS), has by industry and government agencies increased significantly over the years. Communication between neighboring cars may improve safety, driving efficiency, and user experience. In addition, the concept of 'connected car' provides connectivity from the vehicle to a network cloud and makes use of V2X services which are provided in the network. There are many research projects and field tests of connected vehicles in various countries or regions, including projects that are based on the use of existing cellular infrastructure.

The collective term Vehicle-to-Anything (V2X) is often used for vehicular communications services. From an application point of view, V2X may include any of the types of communication/services depicted in FIG. 1. As depicted, FIG. 1 illustrates vehicle-to-vehicle (V2V), vehicle-to-infrastructure (V2I), vehicle-to-pedestrian (V2P), and vehicle-to-network communication/services.

V2V covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information (such as position, direction and speed) transmitted to other vehicles in the proximity repeatedly (every 100 ms-1 s). Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. A central characteristic of V2V applications is the tight requirements on latency that can vary from 20 ms (for pre-crash warning messages) to 100 ms for other road safety services.

V2I comprises communication between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts, and curve speed warnings. Due to the safety related nature of V2I, delay requirements are similar to V2V requirements.

V2P covers communication between vehicles and vulnerable road users, such as pedestrians, using V2P applications. V2P typically takes place between distinct vehicles and pedestrians either directly or via infrastructure such as cellular network.

V2N covers communication between a vehicle and a centralized application server (or an ITS Traffic Management Center). Specifically, the communication is between a V2N application in the vehicle and a V2N application in the centralized application server. The V2N communication uses infrastructure-based communication, such as a cellular network. One example is a bad road condition warning sent to all vehicles in a wide area, or traffic flow optimization in which a V2N application suggests speeds to vehicles and coordinates traffic lights. Therefore, V2N messages are supposed to be controlled by a centralized entity (i.e. the Traffic Management Center) and provisioned to vehicles in a large geographical area, rather than in a small area. Additionally, unlike V2V/V2I, latency requirements are more relaxed in V2N because it is not meant to be used for non-safety purposes, e.g. is latency requirement is typically considered.

The development of V2X standards, including the application layer, have so far been based on IEEE 802.11p dedicated short-range communication (DSRC) as in the ETSI Intelligent Transport Systems (ITS G5) and IEEE WAVE (Wireless Access in Vehicular Environments) families of specifications. FIG. 2 illustrates example protocol stacks for ETSI ITS and IEEE WAVE. Depending on the application layer protocol, either IP-based or non-IP-based transmission is used. For example, for V2V and V2I, non-IP based broadcast transmission may be typically used. As another example, for V2N, IP-based communication may be used.

The DSRC-based V2X communication inherently provides short range coverage (such as 250-500m). In order to provide a wide area coverage, V2X communication is dependent on the deployment of Road-Side Units (RSUs), which may be used as a relay. Moreover, by connecting the DSRC-based RSU to a Traffic Management Center, it is also possible to use V2N applications over DSRC. FIG. 3 illustrates DSRC-based V2X communication using Road-Side Units (RSUs).

Besides providing pure relaying functionality, the RSU is also typically involved in Vehicle-to-Infrastructure (V2I) communication. Some of the use cases where the RSU is involved may include, for example, V2I Emergency Stop, Queue Warning, Automated Parking System, and V2X road safety service via infrastructure.

A concept of geographical networking ("GeoNetworking") is specified, in ETSI TS 102 636-4-1. Specifically, it is described how a wireless device may transmit a "GeoBroadcast" packet, including V2X application data, with a geographical area ("GeoArea") as the destination of that packet. This GeoArea is part of the Geonetworking header.

A device which receives such a GeoBroadcast packet uses the included GeoArea to decide whether it is the intended receiver of that packet and whether to route the packet further. For example, if the receiving device is located within the GeoArea, the device may identify itself as an intended recipient and route the packet further using relaying.

Because of the range limitations of DSRC and to avoid deploying a new separate technology and/or wireless infrastructure only for V2X, reuse of the cellular network for V2X communication is desired. However, the cellular network infrastructure cannot alone support all types of vehicular application for V2V communication. In particular, the cellular network infrastructure cannot support rapid exchanges of information between a large numbers of cars in proximity. Thus, a direct wireless communication may still be needed as a complement.

Recently, 3GPP agreed to investigate the use of the Evolved Packet System (EPS), including LTE as a wireless technology for V2X services. It was intended that Rel-14 would include the support for V2X, as described in 3GPP TR 22.885 V14.0.0 (2015-12), Study on LTE support for Vehicle to Everything (V2X) services. Proximity-based Services (ProSe) (also known as, Device-to-Device communications (D2D)) introduced in 3GPP Rel-12 already provides the basic functionality to support direct communication for V2X services over the so called sidelink (also known as the PC5 interface). For example, a direct link between wireless devices has been introduced in 3GPP Rel-12. Furthermore, LTE-based broadcast services, such as eMBMS, could provide additional functionalities for V2X services.

FIG. 4 illustrates an example of how LTE can be used for V2X communication. Specifically, FIG. 4 depicts using a combination of sidelink (aka D2D/PC5) and uplink/downlink over Uu. A vehicle in the V2X context may include a (vehicle) UE, which in turn provides a Uu interface as well as a PC5 interface which corresponds to the sidelink interface. Moreover, both UE-based RSUs (providing PC5 connectivity with vehicle UEs) as well as eNB-based RSUs (providing only Uu connectivity with vehicle UEs) have been discussed as two alternative realizations of the RSU.

Machine type communication (MTC) represents a significant growth opportunity for the 3GPP ecosystem. To support the so called 'Internet of Things' (IoT), 3GPP operators have to address usage scenarios with devices that are power efficient (with battery life of several years), can be reached in challenging coverage conditions such as, for example, indoors and in basements, and are cheap enough to be deployed on a mass scale while preferably being disposable.

In order to optimize the support of 'Internet of Things' in 3GPP cellular networks and to compete with non-3GPP technologies in the lower data rate and low complexity end of the MTC market, architecture changes and solutions are needed. For example, security solutions, simplification for signaling, and mobility have been introduced in the Rel-13 for a 3GPP cellular system of ultra-low complexity and low throughput. "Internet of Things" devices that may also be constrained with respect to, for example, processing power, memory, battery capacity, and other constraints are also needed.

It is not uncommon to find applications in the machine-to-machine world which utilize non-IP data. For example, 6LowPAN, MQTT-SN, and other applications utilize non-IP data and do not use the Internet Protocol (IP) network layer. When such applications are deployed in the mobile domain (over CIoT), the non-IP data needs to be transferred between Application/Service Capability servers and CIoT devices. Until recently, the Evolved Packet System (EPS), based on LTE radio technology, only supported IP-based applications.

A solution has been introduced in 3GPP Rel-13 using so called 'non-IP PDN connection' that enables data transfer of applications that do not make use of IP. FIG. 5A illustrates support for non-IP data over EPS. FIG. 5B illustrates non-IP data paths through EPS.

FIG. 6 depicts a solution supporting transfer of non-IP data over the MME. Specifically, FIG. 6 depicts transfer of non-IP data over the Control Plane (CP) over the T6a interface towards the Service Capability Exposure Function (SCEF) and Application Server, as discussed in 3GPP TS 23.401v13.6.0.

Alternatively, the non-IP data path can be mapped on the User Plane (UP), the S1-U, S5/8 and SGi. Further details can be found in 3GPP S2-161259 and in 3GPP TS 23.401v13.6.0.

A Service Data Flow (SDF), as defined in 3GPP TS 23.203, is an aggregate of packet flows that matches a service data flow template. Each Service Data Flow is associated with a QoS treatment. Moreover, in the EPC/E-UTRAN, an EPS bearer is the level of granularity for bearer level QoS control. Specifically, all traffic mapped to the same EPS bearer receives the same bearer level packet forwarding treatment. For example, all traffic mapped to the same EPS bearer uses the same scheduling policy, queue management policy, rate shaping policy, RLC configuration, and other EPS-bearer-specific treatments. Providing different bearer level packet forwarding treatment requires separate EPS bearers. This means that, for example in case of EPC/E-UTRAN, an EPS bearer can be used to realize the QoS treatment of a Service Data Flow. Where multiple QoS levels are provided, each QoS level may be associated with a SDF.

An EPS bearer is established when the UE connects to a Packet Data Network (PDN). The EPS bearer remains established throughout the lifetime of the PDN connection to provide the UE with always-on IP connectivity to that PDN. The established EPS bearer is referred to as the default bearer. Any additional EPS bearer that is established for the same PDN connection is referred to as a dedicated bearer.

As also depicted in FIG. 6, the actual data packets transmitted over an EPS bearer use the Radio Bearer, which may also be known as the Data Radio Bearer (DRB), when sent over the LTE Uu radio interface between the UE and the eNB. The data packets use the S1 bearer when sent over the S1 interface between the eNB and the S-GW (Serving Gateway), and the data packets use the S5/S8 bearer when sent over the interface between the S-GW and the PDN Gateway (P-GW).

The EPS bearer traffic flow template (TFT) is the set of all packet filters associated with that EPS bearer. An UpLink Traffic Flow Template (UL TFT) is the set of uplink packet filters in a TFT. A DownLink Traffic Flow Template (DL TFT) is the set of downlink packet filters in a TFT. Every dedicated EPS bearer is associated with a TFT. A TFT may be also assigned to the default EPS bearer. The UE uses the UL TFT for mapping traffic, that is, packets constituting a Service Data Flow, to an EPS bearer in the uplink direction. The PCEF (for GTP-based S5/S8) or the BBERF (for PMIP-based S5/S8) uses the DL TFT for mapping traffic, that is, packets constituting a Service Data Flow, to an EPS bearer in the downlink direction.

The set of packet filters associated with a given TFT defines which data packets, constituting a Service Data Flow are mapped onto a given bearer. Each packet filter identifies the packets belonging to a certain Service Data Flow, also known as a packet flow aggregate. The packet filter information is typically a 5-tuple, defining the source and destination IP addresses, source and destination port, and a protocol identifier identifying, for example, UDP or TCP as part of the packet itself. The packet filter information may also include other parameters. However, the current EPS QoS concept only supports QoS differentiation and enforcement for IP-based data and only over the Uu interface.

The QoS differentiation for LTE D2D communication is known as ProSe Per-Packet-Priority (PPPP), as specified in 3GPP TS 23.303 section 5.4.6 (and 3GPP TS 36.321 section 5.4.1.3.1 (MAC specification). The PPPP value is selected by the application layer. The PPPP is associated with the individual application protocol data unit (PDU) down to the underlying 3GPP layer in the UE. This PPPP value indicates the priority of the packet and is used by the transmitting UE for differentiation of packets on the sidelink radio channel. For example, in order to provide a certain level differentiation, also known in this context as a certain priority, to all the originating packets constituting a given Service Data Flow, the application typically would associate all the packets constituting this Service Data Flow with the same PPPP value. The PPPP can have 8 different values and a lower value means higher priority.

For Rel-12-13 LTE D2D communication over the sidelink, there are two communication modes. In the first mode, known as "Mode-1" or "eNB-scheduled mode", the UE needs to have sidelink grants issued by the eNB before transmitting data. Specifically, when a UE has data to transmit over the sidelink, the UE sends a Sidelink Buffer Status Report (BSR) MAC control element to the eNB over the Medium Access Control (MAC) protocol. This Sidelink BSR, which is similar to the BSR used for uplink Uu communication, indicates the amount of data in the transmit buffers of the UE for each logical channel group and destination. Where the eNB decides that the UE is allowed to transmit data, the eNB issues a scheduling grant to the UE over the PDCCH physical channel. The scheduling grant is valid during a given period of time but does not indicate on which logical channel or bearer on the sidelink that the UE may transmit. Thus, the UE may transmit low priority data even if the sidelink BSR actually was triggered by high priority data. As such, there is no enforcement of the QoS differentiation by an eNB or other network node.

In the second mode, known as mode-2 or UE autonomous mode, the UE is configured with a resource pool to be used for transmission. This resource pool is provided by the eNB, using System Information broadcast when in network coverage. The resource pool may also be provided as preconfigured information stored in the UE to be used when outside of network coverage. When transmitting data on the sidelink in this mode, the UE selects a resource within the pool and issues a Scheduling Assignment (SA) physical layer message to inform other UEs within proximity that the UE has data to transmit and on which resources in the pool the data will be sent. No priority information is included in the SA. Thus, no QoS differentiation is possible in the same resource pool.

The current solution in EPC/E-UTRAN, to carry non-IP traffic, such as a Service Data Flow, which includes non-IP based packet flow(s), over Uu is limited to support one default non-IP bearer for each UE. This implies that no QoS differentiation is possible for non-IP EPS bearers, and as a result not possible for a Service Data Flow which includes non-IP based packet flow(s).

The present method for mapping data onto an EPS bearer only supports data based on the Internet Protocol (IP). Specifically, in order to use the packet filters to identify data as belonging to a given EPS bearer, the data must be encapuslated in an IP packet. The IP header is examined by the packet filter function. Data which is not sent in IP packets cannot use the TFT packets filters. Thus, in order to support QoS differentiation between several non-IP bearers (default or dedicated), the current packet filtering of the TFT cannot be used for mapping of the non-IP data.

A similar problem also exists for the PC5, which may also known as the sidelink, used for D2D communication in LTE. PC5 does not support non-IP data. Moreover, on PC5, the method known as PPPP, has been specified for QoS differentiation. However, how the transmitting UE actually prioritizes packets based on the PPPP value is largely left to UE implementation. Because it is up to the UE to implement, there is no enforcement of the priority value. Additionally, there is no difference in charging depending on which priority a UE is using. For example, the network node cannot prevent a cheating UE which marks all the packets with the PPPP value meaning the highest possible priority (and probably not following the intention of the specification).

As described above, the sidelink communication procedure for mode-1 does not include enforcement of the QoS by a network node. The sidelink communication procedure for mode-2 is not able to differentiate between QoS levels of communication taking place within the same resource pool.

There are two ways to perform wireless V2X communication. Specifically, the V2X communication may be performed via a network infrastructure, such as an LTE cellular network. Alternatively wireless V2X communication may be performed by direct communication between the vehicles such as using LTE D2D or DSRC. Both ways to communicate have pros and cons for a given application, such as for example V2V or V2I, and environment. For V2V applications, using LTE D2D or DSRC may be seen as a natural choice. However, not all vehicles meant to be reached by a V2V message may be in direct communication range or even have the capability of receiving LTE D2D or DSRC. Additionally, the direct link may be affected by higher interference than the ordinary cellular link and be subject to the well-known near-far and hidden node problem, which is not desired for road safety applications. On the other hand, using the cellular network may cause unnecessary delays and might require some degree of network coordination if the communication range of certain V2X message should span multiple cells

SUMMARY

To address the foregoing problems with existing solutions, disclosed is systems and methods for quality of service (QoS) differentiation for non-IP based packets, constituting a Service Data Flow, transmitted over radio channels, such as LTE radio channels.

According to certain embodiments, a method by a wireless device is provided for mapping of application data packets, constituting a Service Data Flow, onto bearers. The method includes associating at least one tag value with a bearer upon establishment of the bearer. A tag is attached to a packet when passing the packet to a lower layer. The packet is mapped onto the bearer, and a path to transmit the packet is selected.

According to certain embodiments, a method for QoS differentiation of data packets using autonomous transmission mode, is provided that includes receiving a packet from a remote UE. The packet comprises a Scheduling Assignment. Priority of data sent by the remote UE is determined from the Scheduling Assignment. One or more QoS parameters is ensured for the data based on the determined priority.

According to certain embodiments, a UE comprises a processor and an interface. The processor and the interface are coupled to one another, and the processor and interface are configured to associate at least one tag value with a bearer upon establishment of the bearer. A tag is attached to a packet when passing the packet to a lower layer. The packet is mapped onto the bearer and a path to transmit the packet is selected.

According to certain embodiments, a network node comprises a processor and an interface. The processor and the interface coupled to one another and configured to receive packet from a remote UE. The packet comprises a Scheduling Assignment. A priority of data sent by the remote UE is determined from the Scheduling Assignment. One or more QoS parameters is ensured for the data based on the determined priority.

According to certain embodiments, a UE comprises logic encoded on a non-transitory computer readable medium that when executed by a processor causes the UE to associate at least one tag value with a bearer upon establishment of the bearer. A tag is attached to a packet when passing the packet to a lower layer. The packet is mapped onto the bearer, and a path to transmit the packet is selected.

According to certain embodiments, a network node comprises logic encoded on a non-transitory computer readable medium that when executed by a processor causes the network node to receive packet from a remote UE. The packet comprises a Scheduling Assignment. Priority of data sent by the remote UE is determined from the Scheduling Assignment. One or more QoS parameters is ensured for the data based on the determined priority.

According to certain embodiments, a UE comprises a plurality of modules. The modules are configured to associate at least one tag value with a bearer upon establishment of the bearer. A tag is attached to a packet when passing the packet to a lower layer. The packet is mapped onto the bearer, and a path to transmit the packet is selected.

According to certain embodiments, a network node comprises a plurality of modules. The modules are configured to receive a packet from a remote UE. The packet comprises a Scheduling Assignment. Priority of data sent by the remote UE is determined from the Scheduling Assignment. One or more QoS parameters for the data is ensured based on the determined priority.

According to certain embodiments, a method for QoS differentiation of data packets using eNB-scheduled transmission mode comprises receiving information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprises a processor and an interface coupled to one another. The processor and interface are configured to receive information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprises logic encoded on a non-transitory computer readable medium that when executed by a processor causes the UE to receive information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprising a plurality of modules, the modules configured to receive information from a UE. The information is associated with the logical channel or logical channel group to which the UE has mapped one or more tags associated with the packet to be transmitted by the UE. Scheduling for the UE to transmit the packet is optimized based on the information received from the UE.

Certain embodiments of the present disclosure may provide one or more technical advantages. For example, certain embodiments may provide QoS differentiation for non-IP data in an EPS network using Uu and PC5 sidelink, as an evolution of the current EPS bearer concept. Another advantage may be that a method for QoS enforcement over the PC5 sidelink interface for LTE D2D communication is provided for IP-based as well as non-IP data. Still another advantage may be that a certain embodiments provide a way to select a path (e.g. Uu, PC5) based on QoS information. For example certain embodiments may provide a way to select either Uu or PC5 based on QoS information.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions quality of service (QoS) differentiation for non-IP based packets, constituting a Service Data Flow, transmitted over LTE radio channels.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

According to certain embodiments, a two-part solution is proposed, wherein each part of the solution can be used either alone or in combination with each other. The first part of the solution introduces tags to associate with every packet. Each tag may correspond to certain requirements. For example, a tag may correspond to latency, periodicity, or other requirements. As a result, the problem of providing QoS differentiation for non-IP data on LTE radio channels such as on the sidelink and on the Uu interface is provided.

According to certain embodiments, the second part of the solution introduces a Sidelink Data Radio Bearer (SL DRB) associated with an EPS bearer. This solves the problem of QoS enforcement over sidelink. This SL DRB can be established either using dedicated RRC signaling, system information, or by preconfiguration.

Figure 1:
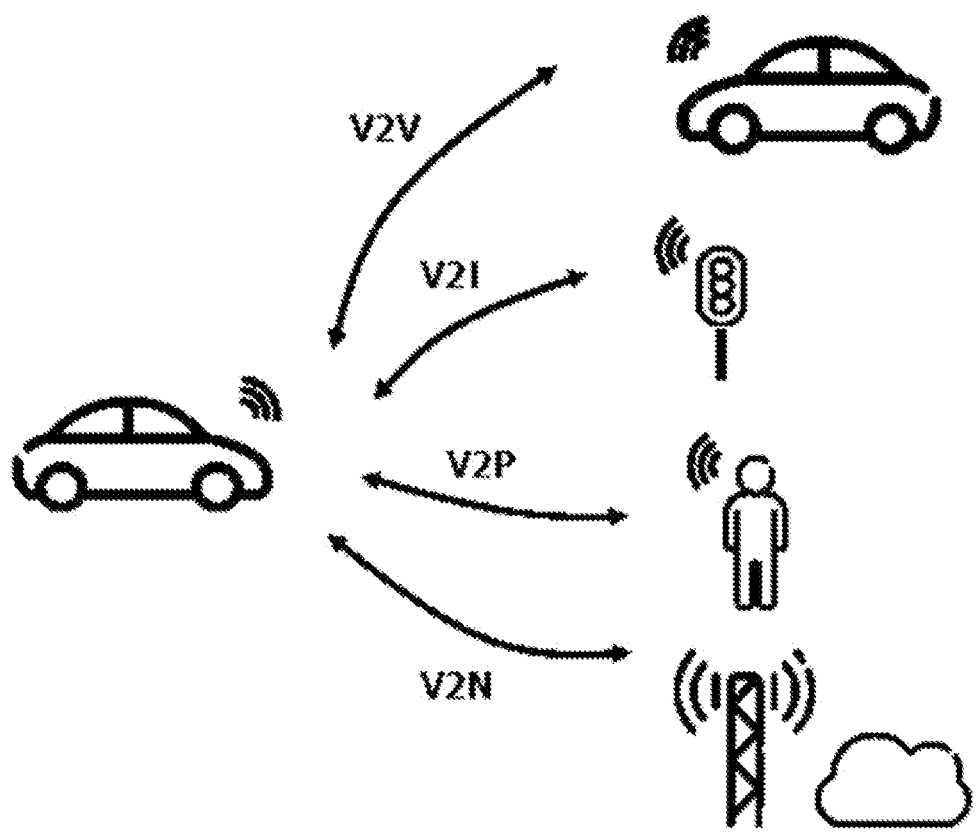
FIG. 1 illustrates example types of vehicle to anything communication/services.
Figure 2:
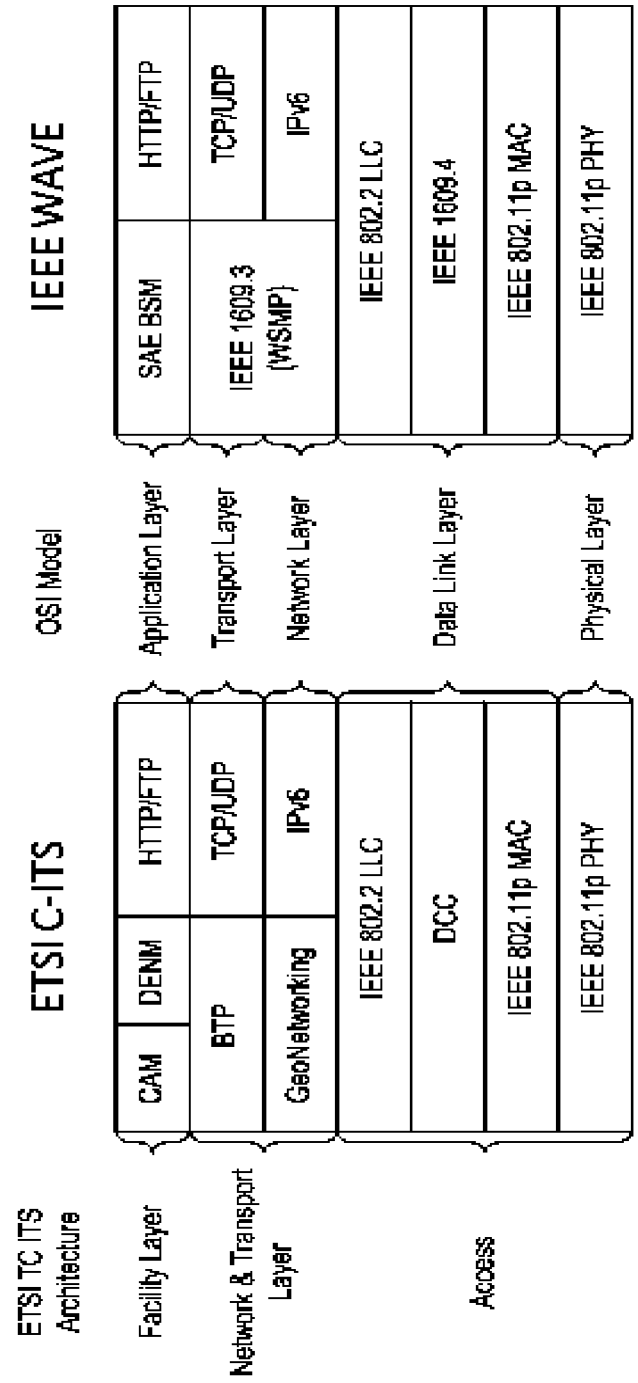
FIG. 2 illustrates example protocol stacks for ETSI ITS and IEEE WAVE.
Figure 3:
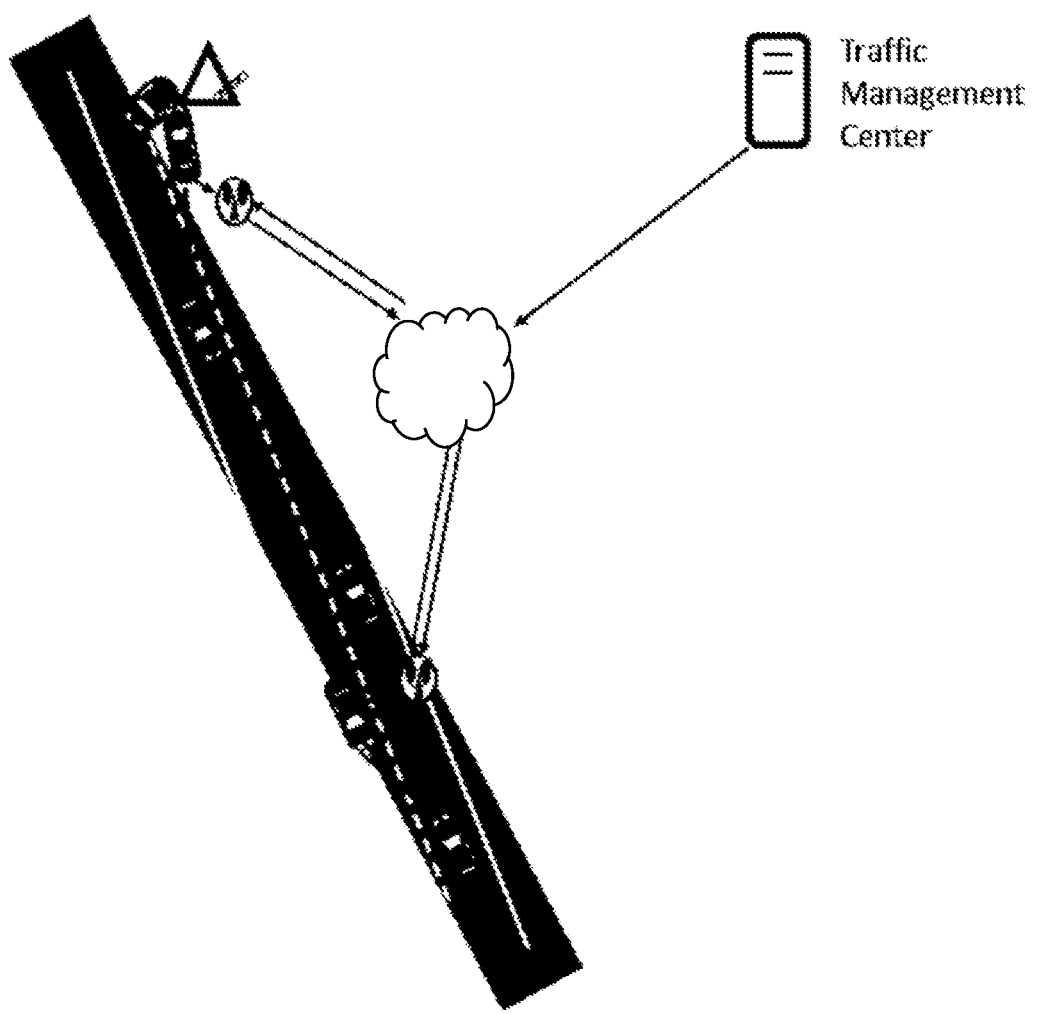
FIG. 3 illustrates DSRC-based V2X communication using Road-Side Units (RSUs)
Figure 4:
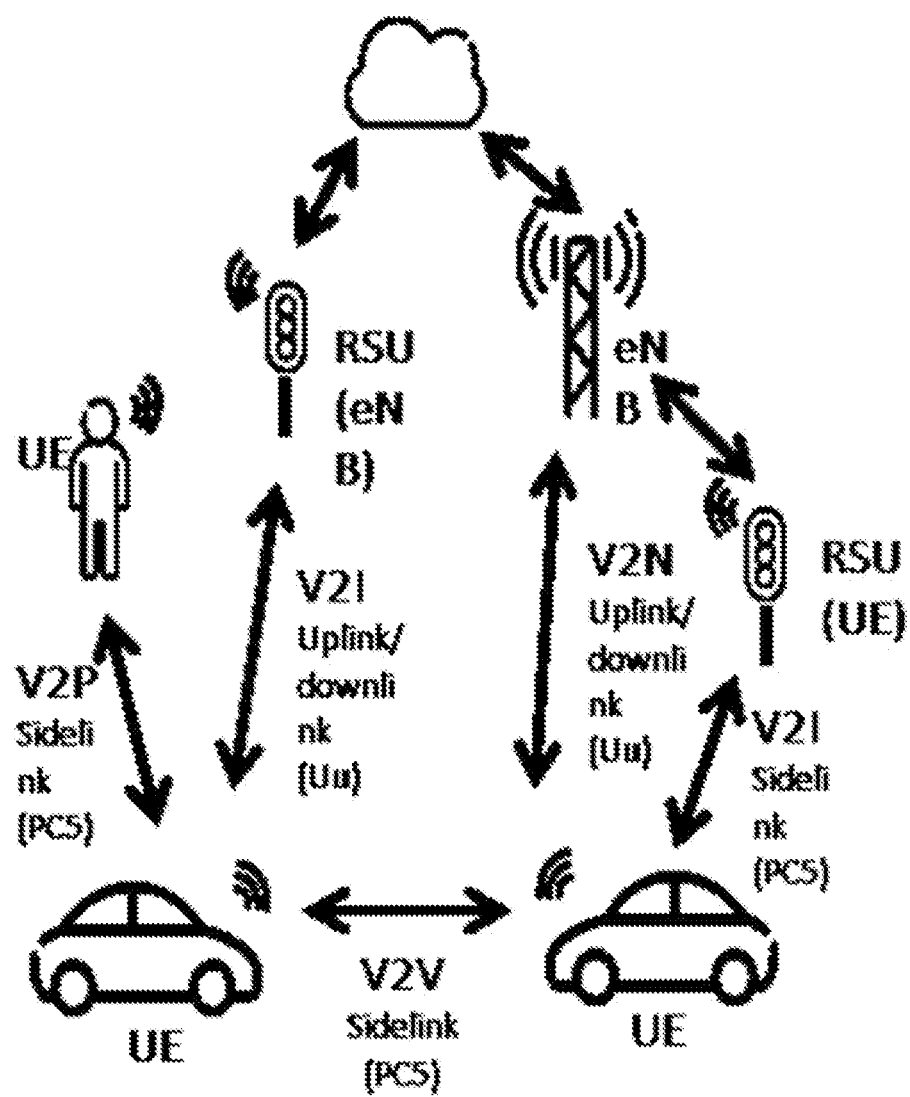
FIG. 4 illustrates using a combination of sidelink (aka D2D/PC5) and uplink/downlink over Uu.
Figure 5A:
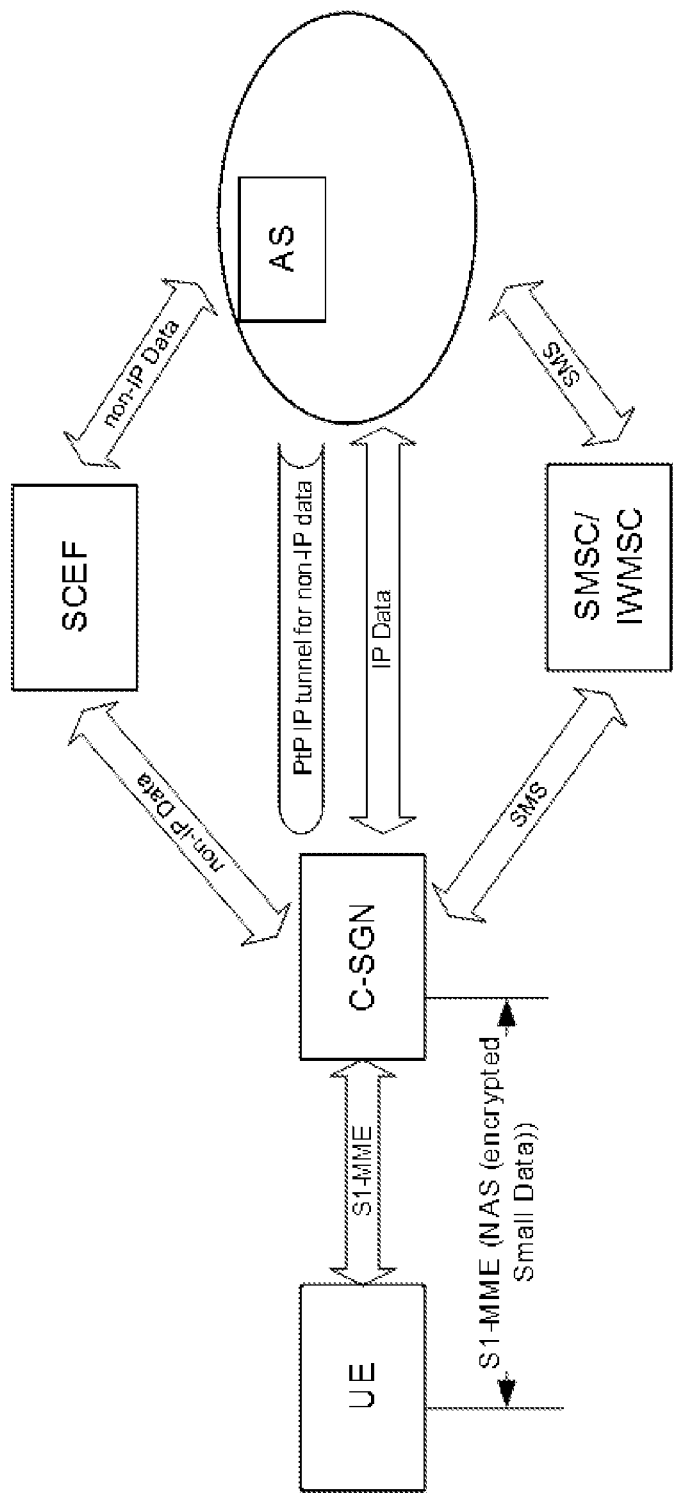
FIG. 5A illustrates support for non-IP data over EPS.
Figure 5B:
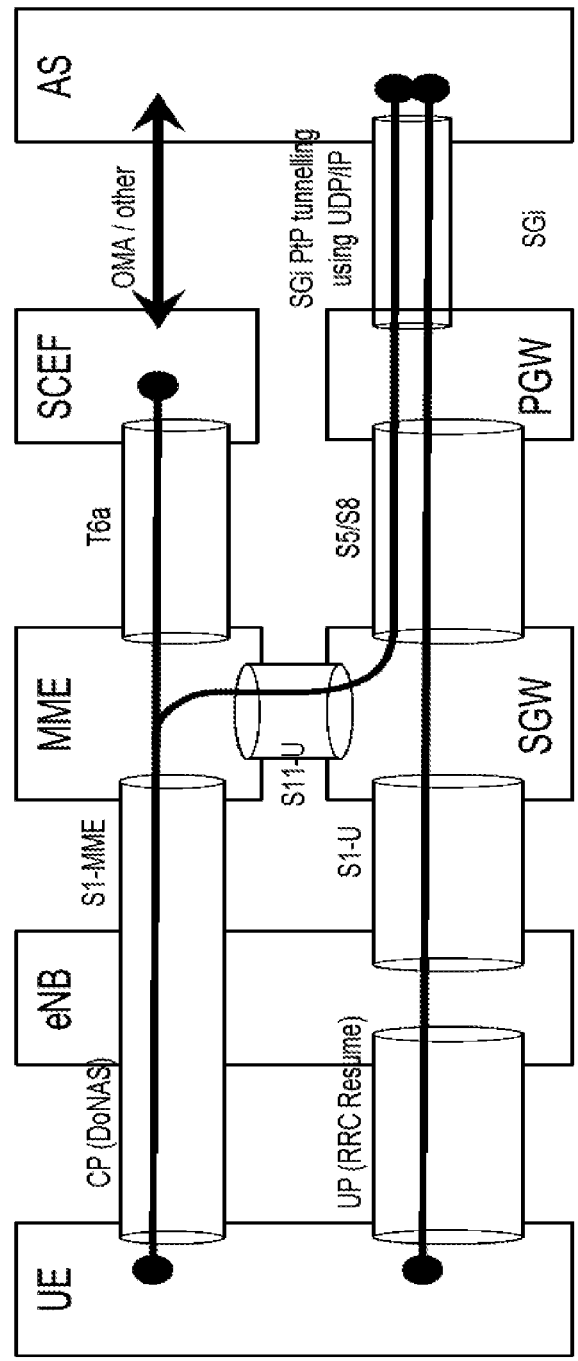
FIG. 5B illustrates non-IP data paths through EPS.
Figure 6:
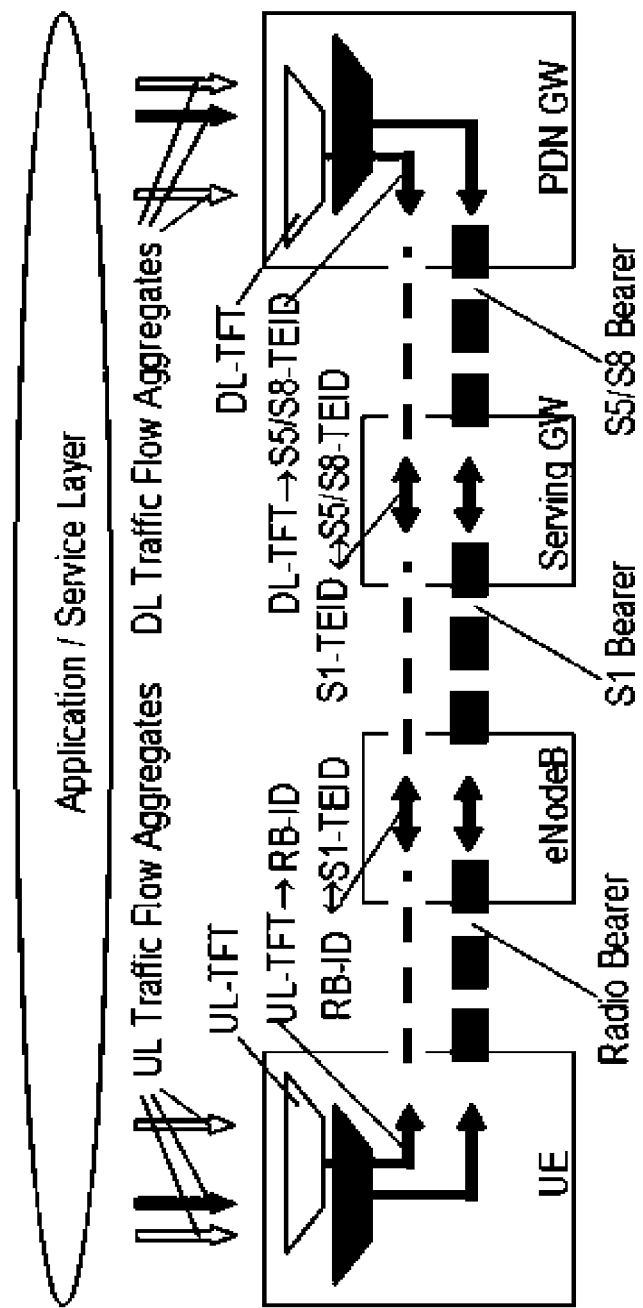
FIG. 6 illustrates a solution supporting transfer of non-IP data over the MME.
Figure 7:
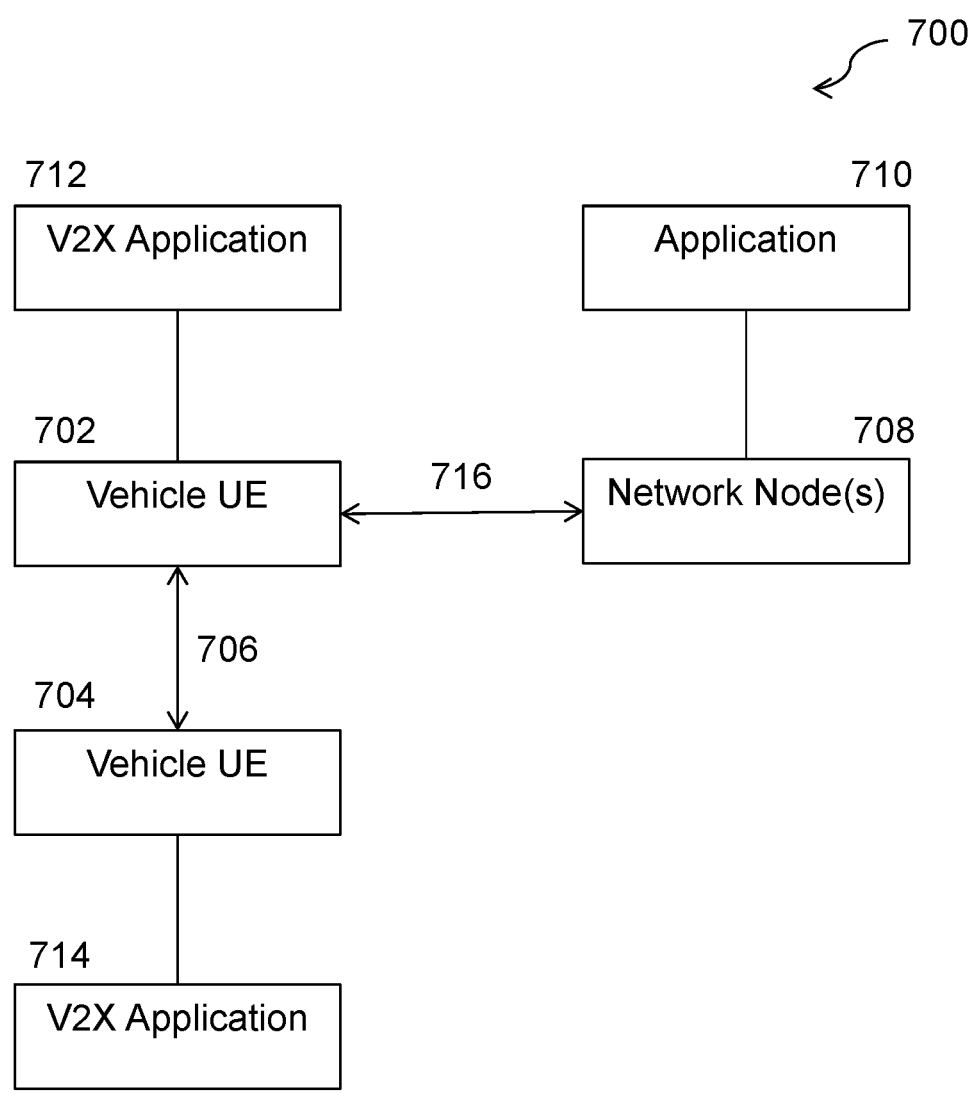
FIG. 7 illustrates an environment for quality of service (QoS) differentiation for non-IP based packets transmitted over LTE radio channels, according to certain embodiments.

Particular embodiments are described in FIGS. 7-13 of the drawings, like numerals being used for like and corresponding parts of the various drawings. FIG. 7 illustrates an environment 700 for quality of service (QoS) differentiation for non-IP based packets transmitted over LTE radio channels, according to certain embodiments. As depicted, a first vehicle UE 702 and a second vehicle UE 704 communicate using the PC5/sidelink interface 706 for direct communication. According to particular embodiments, a vehicle UE 702, 704 may include User Equipment (UE) according to 3GPP. However, the vehicle UEs 702, 704 are used for V2X communication and are placed in a vehicle such as a car, for example. As used herein, vehicle UE, UE, and wireless device may be used interchangeably.

Each Vehicle UE 702, 704 has a V2X application, such as V2V, V2I, V2P and/or a V2N application, in certain embodiments. The V2X applications typically resides in the vehicle. Additionally, a vehicle UE 702, 704 inside network coverage may be connected to the infrastructure cellular network. For example, in certain embodiments, a vehicle UE 702, 704 may be connected to an LTE-based EPS network via network nodes 708. Example network nodes 708 may include an eNB, MME, P-GW, or other network node and are described in more detail below.

As further depicted, one or more V2X applications 710 may be connected to one or several network nodes 708. More specifically, the V2X applications 710 may be connected with the vehicle UEs 702, 704 may communicate using the PC5 interface 706, or, when inside network coverage via network nodes 708. Moreover, the V2X applications 712 and 714 of respective vehicle UEs 702 and 704 may use V2X communication with the V2X application 710 connected with a network node 708, while the vehicle UE 702, 704 is inside coverage using the Uu interface 716.

When the V2X applications 712, 714 communicates using the PC5 interface 706 or when the V2X applications 710, 712, 714 communicates using the Uu interface 716, this communication typically uses data packets constituting a Service Data Flow associated with a given QoS.

According to certain embodiments, tags may be used to enable packet differentiation regardless of whether the packet is transmitted or received over the PC5 706 or Uu 716. If bearers are present, such tags may be used to decide on which bearers the packets should be mapped. This is different from PPPP where, for example, for unicast uplink traffic the ProSe UE-to-Network Relay uses the uplink TFTs to select the uplink EPS bearers for relayed uplink packets independently from the ProSe Per Packet Priority applied over PC5 by Remote UEs (3GPP TS 23.303 Sec. 5.4.6.2).

Further, for unicast downlink traffic the ProSe UE-to-Network Relay maps the QCI of the EPS bearer into a ProSe Per-Packet Priority value to be applied for the downlink relayed unicast packets over PC5. Thus, EPS bearers associated with the same QCI, but different ARP values result in the same ProSe Per-Packet Priority over PC5, which would limit the QoS flexibility. However, using tags, as proposed herein, enables preserving the way packets treated.

According to certain embodiments, when a vehicle UE 702, 704 has an EPS bearer established, when the vehicle UE 702, 704 is used to carry V2X-related traffic, such as V2V or V2I traffic, and when the vehicle UE 702, 704 has data to transmit, the vehicle UE 702, 704 typically uses a service request procedure to obtain the associated Data Radio Bearer (DRB) and establish the S1-U bearer. These bearers may also be established following the EPS bearer establishment procedure as part of the attach procedure, according to certain example embodiments. At some time when the vehicle UE 702, 704 does not transmit or receive data, the DRB(s) and S1-U bearer(s) for all the established EPS bearers are released. For example, the DRB(s) and S1-U bearer(s) may be released due to inactivity detection.

Figure 8:
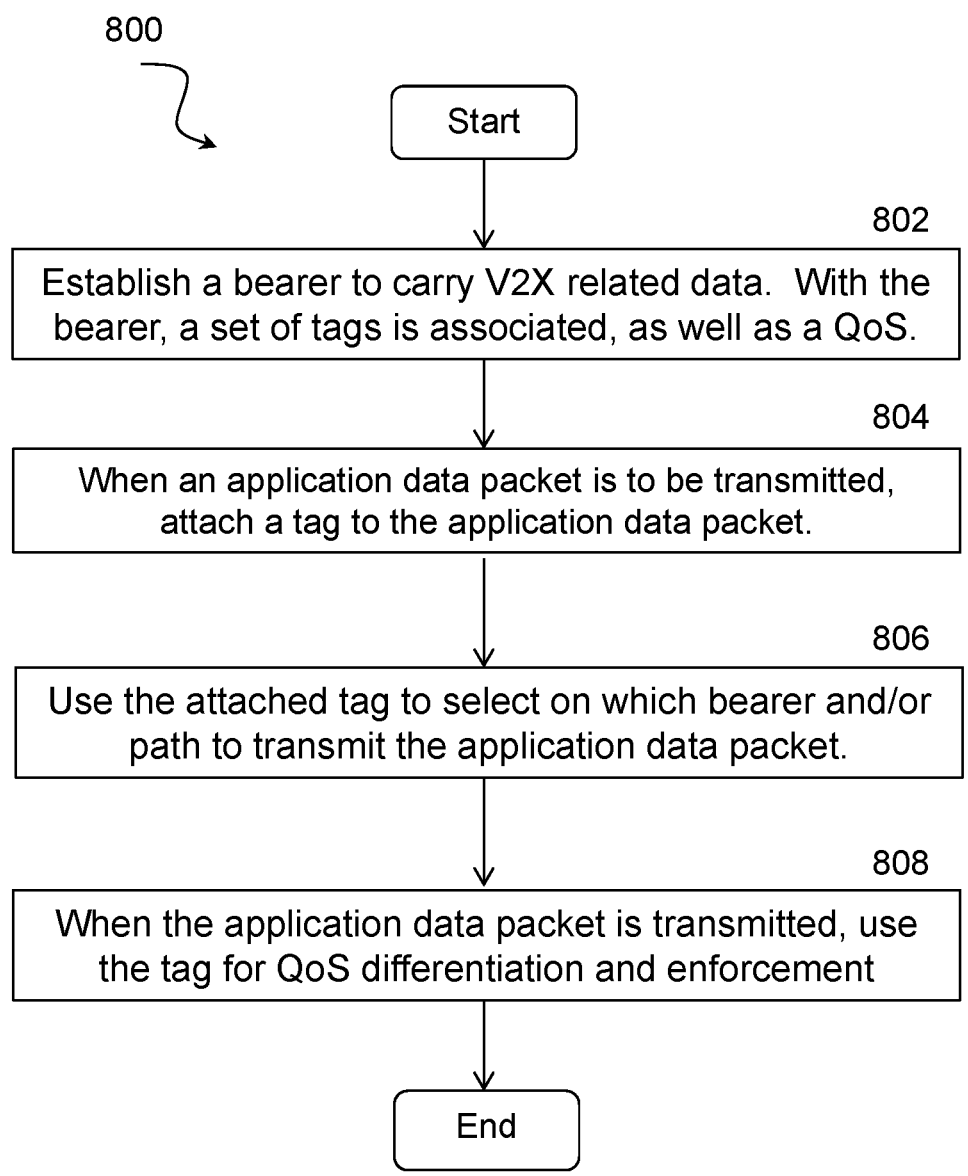
FIG. 8 illustrates a flow diagram of a method for QoS differentiation for non-IP based packets transmitted over LTE radio channels, according to certain embodiments.

FIG. 8 illustrates a flow diagram of a method 800 for QoS differentiation for non-IP based packets transmitted over LTE radio channels, according to certain embodiments. The method begins at step 802 when a bearer is established to carry V2X-related application layer data, typically constituting a Service Data Flow, to/from the vehicle UE 702, 704. With the bearer, a set of tags is associated. Additionally, a QoS may be associated.

At step 804, and when an application data packet is to be transmitted, the application attaches a tag to the packet and sends it to the vehicle UE 702, 704 or a network node 708. The vehicle UE 702, 704 or network node 708 uses the attached tag to select on which bearer and/or path to transmit the data packet at step 806.

At step 808, the tag is used for QoS differentiation and enforcement when the data packet is transmitted.

Figure 9:
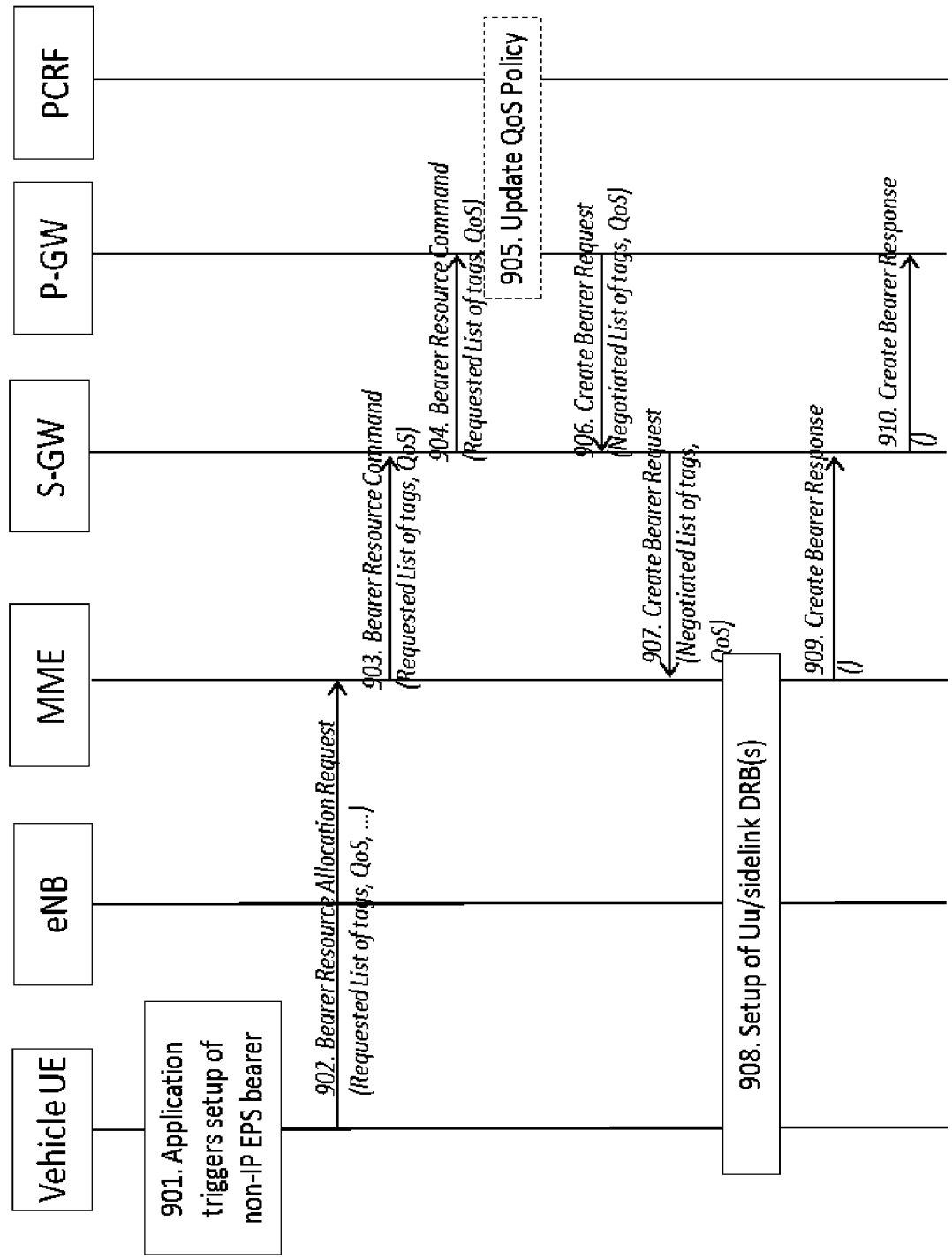
FIG. 9 illustrates a sequence diagram for UE-triggered activation by a V2X-related application layer data, typically constituting a Service Data Flow, of the establishment of a non-IP bearer, according to certain embodiments.

FIG. 9 illustrates a sequence diagram for UE-triggered activation by a V2X-related application layer data, typically constituting a Service Data Flow, of the establishment of a non-IP bearer, according to certain embodiments. Included is an establishment of a Sidelink Data Radio Bearer (SL-DRB) at step 908. Whether a SL DRB should be established for an EPS bearer is decided by a network node, which may include, for example, the Mobility Management Entity (MME), P-GW, or the Policy and Charging Rules Function (PCRF), in certain embodiments.

At step 901, the application in a vehicle UE 702 typically constituting a Service Data Flow, 704 triggers setup of an EPS bearer. For example, the application may trigger the setup of the EPS bearer by sending data, typically constituting a Service Data Flow, attached with a tag. In certain embodiments, the setup request may include a requested set of tags for the user data, typically constituting a Service Data Flow, to be associated to the bearer.

Specifically, at step 902, the vehicle UE 702, for a particular Service Data Flow, 704 sends a Bearer Resource Request message to the MME 708, including the requested set of tag values and optionally QoS information, such as QCI. At steps 903 and 904, the MME 708 requests the S-GW and P-GW to process a new resource request and includes the requested list of tags and QoS information.

In other embodiments, the trigger to setup the EPS bearer may come from a network node 708 such as the P-GW or the PCRF, rather than from the vehicle UE 702, 704. Where the trigger is from the EPS bearer, steps 901-904 may be skipped.

At step 905, the PCRF decides whether to set up for a Service Data Flow a new EPS bearer and which tag values to accept. In certain embodiments, for example, the PCRF may decide whether to set up for a Service Data Flow the new EPS bearer based on network node configuration or using information particular to vehicle UE subscription information. The accepted tag values may include a negotiated list of tags. In certain embodiments, the PCRF also maps the accepted tag values and the QoS, if included, onto a selected QCI and triggers setup of an EPS dedicated bearer with that QCI, using existing procedures. At this point, the P-GW/PCRF may also decide whether this EPS bearer may be mapped onto a Uu DRB, a sidelink DRB, or both.

At steps 906-907, the P-GW requests, via the S-GW, the MME to perform a bearer resource request. Specifically, the information created in step 905 may be forwarded. The forwarded information may include QoS information and the negotiated list of tags. It may also include information about whether to setup Uu and/or sidelink DRBs for this EPS bearer.

At step 908, the MME may order the vehicle UE 702, 704 and eNB 708 to establish Uu and/or sidelink DRB(s) and EPS bearer, as described below with respect to FIG. 10. In the Session Management Request message from MME to vehicle UE 702, 704, the MME includes the negotiated list of tags for the data constituted by a Service Data Flow to be mapped onto that EPS bearer. the Session Management Request may be encapsulated in the Bearer Setup Request to the eNB 708. The vehicle UE 702, 704 configures the received negotiated tag value(s) as part of packet filter(s) associated with the Service Data Flow on a EPS bearer.

At steps 909 and 910, the MME returns the result of the bearer request procedure to the P-GW via the S-GW.

Figure 10:
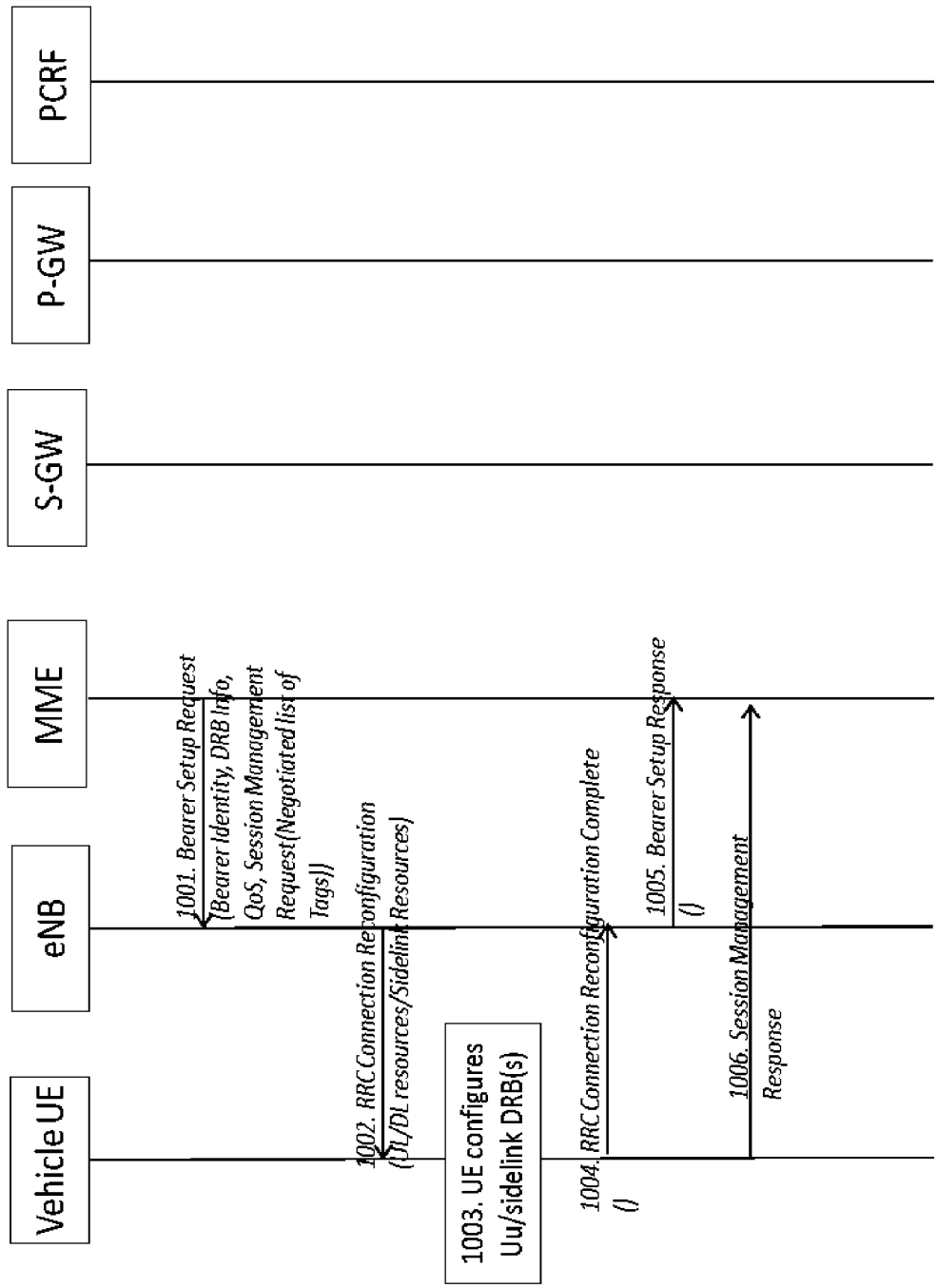
FIG. 10 illustrates a sequence chart for the setup of Uu/sidelink data radio bearers (DRBs), according to certain embodiments.

FIG. 10 illustrates a sequence chart for the setup of Uu/sidelink data radio bearers (DRBs) when requested by the MME, according to certain embodiments. The sequence can be triggered by the attach procedure described above or when the vehicle UE 702, 704 has data constituting a Service Data Flow to transmit. For example, in some cases, having data to transmit causes the vehicle UE 702, 704 to transmit a Service Request Message sent from the vehicle UE 702, 704 to the MME, which in turn triggers the DRB establishment.

At step 1001, the Bearer Setup Request indicates to the eNB 708 whether Uu and/or sidelink DRBs are requested, as well as the required QoS for each of these DRB(s). The eNB 708 sets up Uu and/or sidelink DRBs(s) with logical channel identit(ies) to be associated to the EPS bearer as well as the required QoS.

At step 1002, the eNB 708 sends an RRCConnectionReconfiguration message to the vehicle UE 702, 704, including Uu DRB and/or sidelink DRB information, such as logical channel identities, which resource pool, and scheduling mode to use for the sidelink DRB, if any. The scheduling mode may include eNB scheduling or UE autonomous scheduling, according to certain embodiments. In a particular embodiment, which may be considered a special case, two sidelink DRBs may be established. One may be used when the UE uses eNB scheduling. The other sidelink DRB may be used in case of UE autonomous scheduling. In case the bearer setup is triggered by an establishment of an EPS bearer for a Service Data Flow, a Session Management Request message from MME to the vehicle UE 702, 704 is also included and that message is included in the RRCConnectionReconfiguration sent by the eNB 708 to the vehicle UE 702, 704.

At step 1003, the vehicle UE 702, 704 configures the Uu and/or Sidelink DRB(s) with the received information. It also associates the DRBs with the EPS bearer, included in a Session Management Request message received at this point or previously.

At step 1004, the vehicle UE 702, 704 returns a RRCConnectionReconfigurationComplete message to the eNB 708.

At step 1005, the eNB 708 sends a Bearer Setup Response message to the MME. In case the Session Management Request message was included in step 1002, the vehicle UE 702, 704 sends a reply to the MME at step 1006.

According to certain embodiments, the Uu/sidelink DRB(s) may be established using broadcast signalling. For example, a way to reduce the amount of signalling required to establish the Uu and/or sidelink DRBs, is to broadcast this information using System Information periodically broadcasted from the eNB 708 to all UEs 702, 704 (including vehicle UEs) within the cell covered by the eNB. This implies that all UEs will receive the same information and in the simplest case use the same set of DRBs.

According to certain embodiments, the Uu/sidelink DRB(s) may be established by preconfiguration. For example, another way to configure the Uu and/or sidelink DRBs is to preconfigure the information in the vehicle UEs 702, 704, which also means that the information is kept in the UE even after cycling the power of the UE. An example of a method to preconfigure is to connect locally to the UE such as by USB cable, for example. Another example is to use remote configuration device management protocol such as Open Mobile Alliance (OMA) Device Management (DM).

Packets constituting a Service Data Flow are mapped onto bearers. For example, according to certain embodiments, when the UE 702, 704 transmits data constituting a Service Data Flow, the application layer attaches a "tag" value to the application packet. The lower 3GPP layer will then map this packet onto the bearer using the tag value. If the tag does not match any existing bearer, it may drop the packet, map it to a default bearer, or trigger a new bearer resource request message sent to the MME.

The same is valid when Application Server sends data addressed to a particular UE 702, 704. Based on the "tag" value the P-GW maps the packet to a particular bearer. If the tag does not match any existing bearer, it may drop the packet, map it to a default bearer, or trigger a new bearer request message sent to the MME potentially considering the policies provided by the PCRF.

According to certain embodiments, QoS differentiation and enforcement on the sidelink is provided. For the eNB-scheduled mode, the eNB 708 has also been configured with QoS information used to schedule the data sent over the sidelink DRB when the sidelink DRB is established. Moreover, the UE 702, 704 uses the tag value associated with the data packet to select a logical channel. In certain embodiments, the logical channel may be identified by logical channel identity or logical channel group. The UE 702, 704 may include this logical channel or logical channel group in the sidelink BSR. The eNB 708 may then enforce QoS by using the logical channel identity or logical channel group provided in the sidelink BSR in the scheduling grant. As such, the eNB 708 may schedule a single logical channel and provide QoS enforcement, according to particular embodiments.

According to certain embodiments, two UEs 702, 704 are communicating with each other over the sidelink using mode-1, also known as the UE autonomous mode. Both UEs 702, 704 may be out of network coverage. However, the tags can be used to ensure QoS differentiation. As an example, the tags may be used to determine the priority of packets, which can be reflected as an information element in the scheduling assignment (SA) sent by the transmitting UE 702, 704 and read by other UEs in the proximity. This allows other UEs in the neighbourhood to detect the type of data being exchanged, thus enabling them to take actions to ensure QoS, by for example, backing of from transmitting their data if another UE uses a high priority in the SA.

According to certain embodiments, path selection is provided. For example, where an EPS bearer is configured with both a Uu DRB and a sidelink DRB, the tag may also be used to select on which path to transmit the data packet associated with the tag. For example, in case of UE autonomous mode or eNB-scheduled mode, the UE 702, 704 may use a table lookup, using the tag value and the path(s) as result. In another example, the UE 702, 704 may also use measurements of RSRP or RSRQ of the paths together with the tag for path selection. For example, the UE may have thresholds of these load values for each tag value and base these thresholds for path selection.

In yet another example embodiment, where eNB-based scheduling is used, the eNB 708 knows which QoS is associated with the logical channel indicated in the BSR. The eNB 708 also has knowledge of the load on the uplink as well as the sidelink. Accordingly, in certain embodiments, the eNB 708 uses the QoS information to decide on which path to transmit the packet. In certain embodiments, the eNB 708 may send a scheduling grant for the selected path to the UE 702, 704. Specifically, in a particular embodiment, eNB 708 uses the QoS information to decide whether the UE should use the Uu DRB or sidelink DRB to transmit the packet. The eNB 708 may send a scheduling grant for the Uu or sidelink to the UE, in particular embodiments. For example, if the load on Uu is very high also for high priority traffic, a logical channel associated with a QoS indicated low latency tolerance, may be sent on sidelink.

Figure 11:
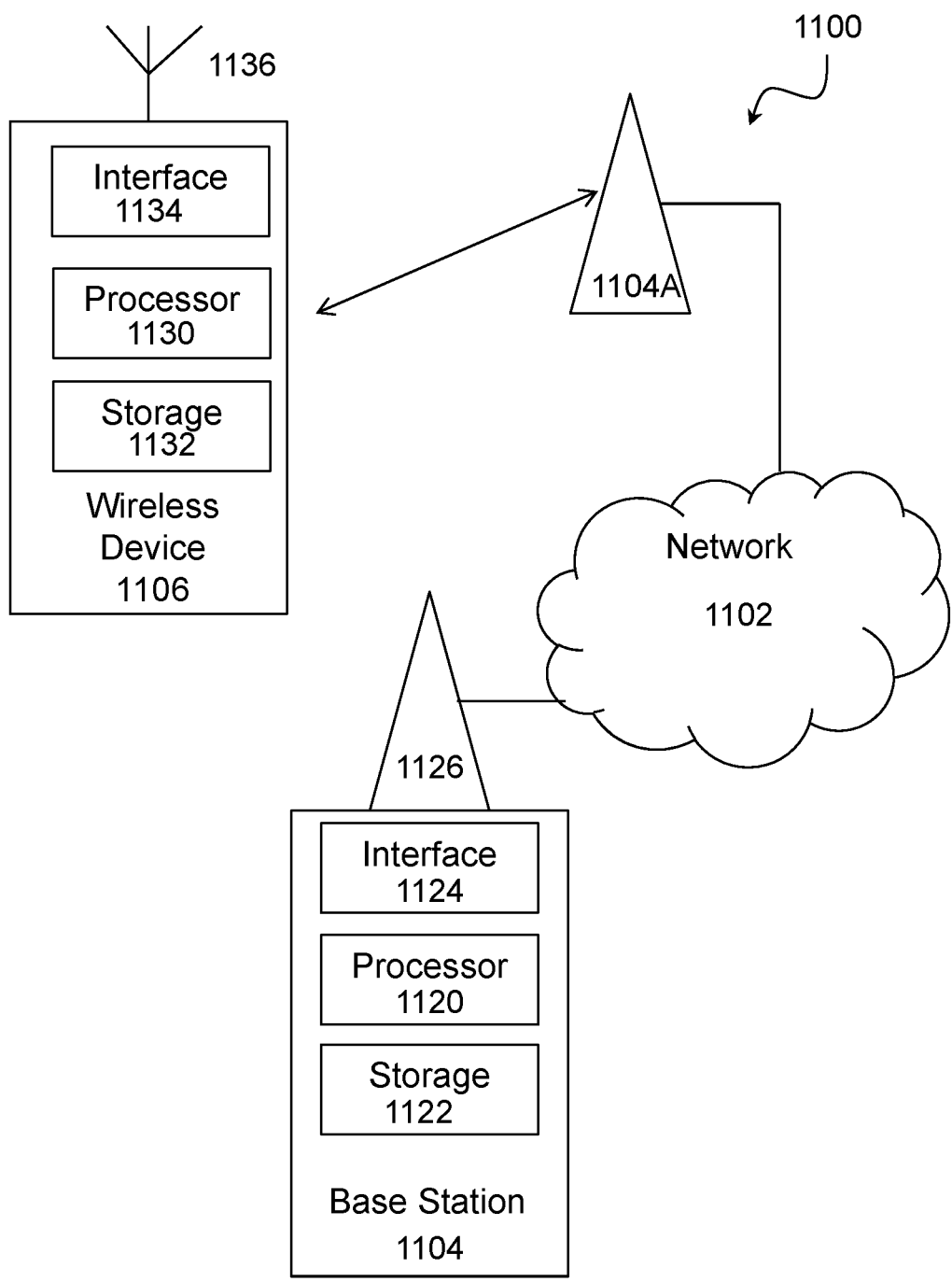
FIG. 11 illustrates an exemplary wireless network, according to certain embodiments.

FIG. 11 illustrates a wireless network 1100, according to certain embodiments. For simplicity, FIG. 11 only depicts network 1102, network nodes 1104 and 1104a, and wireless device 1106. Network node 1104 comprises processor 1120, storage 1122, interface 1124, and antenna 1126 and may also be referred to as a base station 1104. Similarly, wireless device 1106 comprises processor 1130, storage 1132, interface 1134 and antenna 1136 and may also be referred to as a UE 1106. These components may work together in order to provide network node and/or wireless device functionality, such as providing wireless connections in a wireless network 1100. In different embodiments, the wireless network 1100 may comprise any number of wired or wireless networks, network nodes, base stations, controllers, wireless devices, relay stations, and/or any other components that may facilitate or participate in the communication of data and/or signals whether via wired or wireless connections. network node 1104 and wireless device 1106, such as a vehicle UE, in accordance with a particular embodiment.

Network 1102 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 1104 comprises processor 1120, storage 1120, interface 1124, and antenna 1126. These components are depicted as single boxes located within a single larger box. In practice however, a network node may comprises multiple different physical components that make up a single illustrated component (e.g., interface 11242 may comprise terminals for coupling wires for a wired connection and a radio transceiver for a wireless connection). As another example, network node 1104 may be a virtual network node in which multiple different physically separate components interact to provide the functionality of network node 1104. For example, processor 1120 may comprise three separate processors located in three separate enclosures, where each processor is responsible for a different function for a particular instance of network node 1104, according to certain embodiments. Similarly, network node 1104 may be composed of multiple physically separate components. For example, network node 1104 may include a NodeB component and a RNC component, a BTS component and a BSC component, or any other components, which may each have their own respective processor, storage, and interface components. In certain embodiments in which network node 1104 comprises multiple separate components such as, for example, BTS and BSC components, one or more of the separate components may be shared among several network nodes. For example, a single RNC may control multiple eNBs. In such a scenario, each unique eNB and BSC pair may be a separate network node. In some embodiments, network node 1104 may be configured to support multiple radio access technologies (RATs). In such embodiments, some components may be duplicated. For example, separate storage 1122 may be included for the different RATs. Additionally, some components may be reused. For example, the same antenna 1126 may be shared by the RATs.

Processor 1120 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1104 components, such as storage 1122, network node 1104 functionality. For example, processor 1120 may execute instructions stored in storage 1122. Such functionality may include providing various wireless features discussed herein to a wireless devices, such as wireless device 1106, including any of the features or benefits disclosed herein.

Storage 1122 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1122 may store any suitable instructions, data or information, including software and encoded logic, utilized by network node 1104. Storage 1122 may be used to store any calculations made by processor 1120 and/or any data received via interface 1124.

Network node 114 also comprises interface 1124 which may be used in the wired or wireless communication of signalling and/or data between network node 1104, network 1102, and/or wireless device 1106. For example, interface 1124 may perform any formatting, coding, or translating that may be needed to allow network node 1104 to send and receive data from network 1102 over a wired connection. Interface 1124 may also include a radio transmitter and/or receiver that may be coupled to or a part of antenna 1126. The radio may receive digital data that is to be sent out to other network nodes or wireless devices via a wireless connection. The radio may convert the digital data into a radio signal having the appropriate channel and bandwidth parameters. The radio signal may then be transmitted via antenna 1126 to the appropriate recipient such as, for example, wireless device 1106.

Antenna 1126 may be any type of antenna capable of transmitting and receiving data and/or signals wirelessly. In some embodiments, antenna 1126 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 1106 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 1104 and/or other wireless devices 1106. Wireless device 1106 comprises processor 1130, storage 1132, interface 1134, and antenna 1136. Like network node 1104, the components of wireless device 1106 are depicted as single boxes located within a single larger box, however in practice a wireless device may comprises multiple different physical components that make up a single illustrated component. For example, storage 1132 may comprise multiple discrete microchips, and each microchip may represent a portion of the total storage capacity, according to certain embodiments.

Processor 1130 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 1106 components, such as storage 1132, wireless device 1106 functionality. Such functionality may include providing various wireless features discussed herein, including any of the features or benefits disclosed herein.

Storage 1132 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1132 may store any suitable data, instructions, or information, including software and encoded logic, utilized by wireless device 1106. Storage 1132 may be used to store any calculations made by processor 1130 and/or any data received via interface 1134.

Interface 1134 may be used in the wireless communication of signalling and/or data between wireless device 1106 and network node 1104. For example, interface 1134 may perform any formatting, coding, or translating that may be needed to allow wireless device 1134 to send and receive data from network node 1104 over a wireless connection. Interface 1134 may also include a radio transmitter and/or receiver that may be coupled to or a part of antenna 1136. The radio may receive digital data that is to be sent out to network node 1104 via a wireless connection. The radio may convert the digital data into a radio signal having the appropriate channel and bandwidth parameters. The radio signal may then be transmitted via antenna 1136 to network node 1104.

Antenna 1136 may be any type of antenna capable of transmitting and receiving data and/or signals wirelessly. In some embodiments, antenna 1136 may comprise one or more omni-directional, sector or panel antennas operable to transmit/receive radio signals between 2 GHz and 66 GHz. For simplicity, antenna 1136 may be considered a part of interface 1134 to the extent that a wireless signal is being used.

Figure 12:
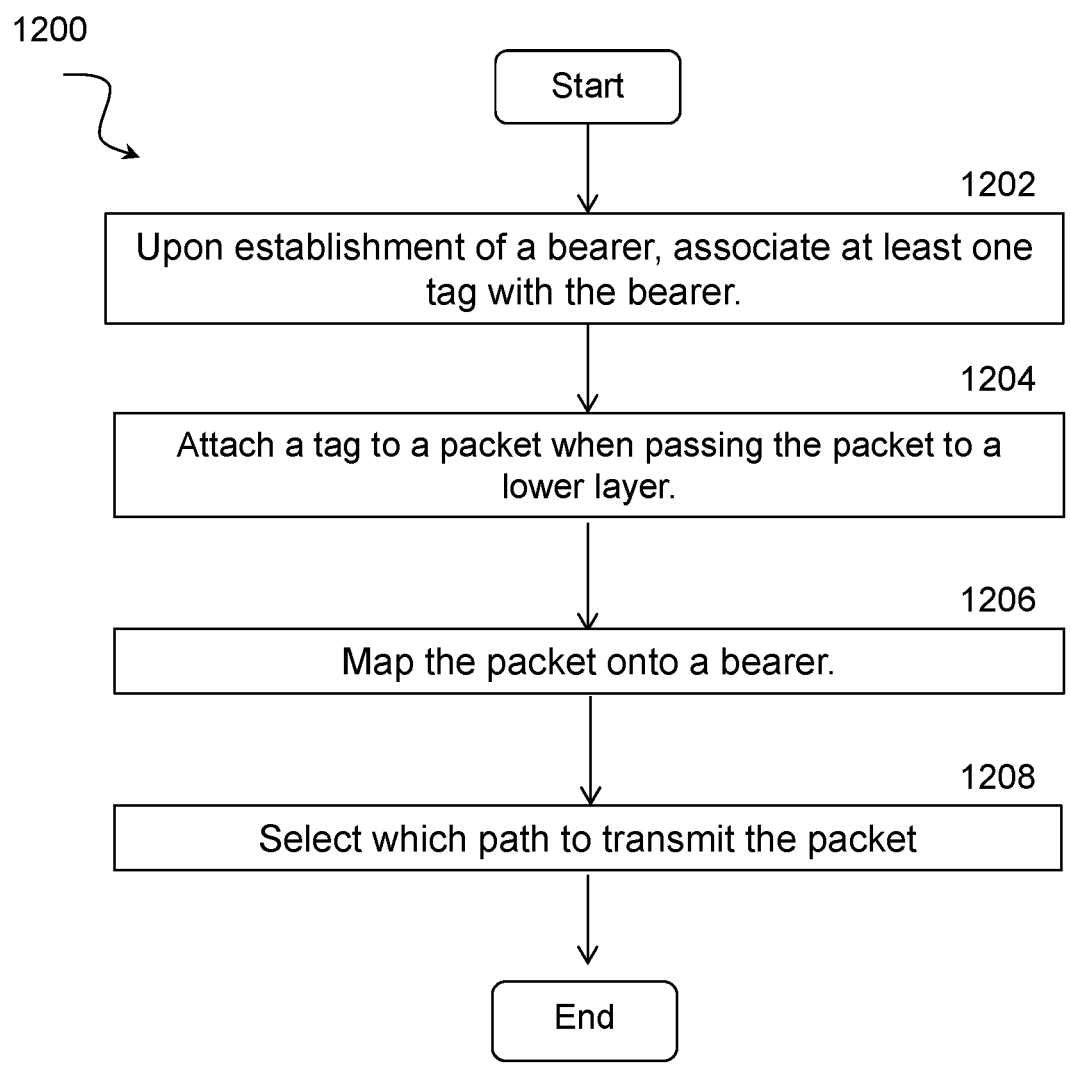
FIG. 12 illustrates another example flow diagram of a method for QoS differentiation for non-IP based packets transmitted over LTE radio channels, according to certain embodiments.

FIG. 12 illustrates another example flow diagram of a method 1200 for QoS differentiation for non-IP based packets, typically constituting a Service Data Flow, transmitted over LTE radio channels by a wireless device such as a UE, according to certain embodiments. The method begins at step 1202 when upon the establishment of a bearer, at least one tag value is associated with the bearer. In a particular embodiment, a QoS, such as the QoS associated with a given Service Data Flow, may also be associated with the bearer. Establishment of the bearer, in some embodiments, may be triggered by a V2X application that may need to start transmit and/or receive packets constituting a given Service Data Flow, and the bearer may be a non-IP bearer.

At step 1204, a tag is attached to a packet, which typically belongs to a given Service Data Flow, when passing the packet to a lower layer. In a particular embodiment, the tag may be attached at an application layer.

At step 1206, the packet is mapped onto a bearer. In a particular embodiment, mapping the packet onto the bearer may include using, by the lower layer, the tag value.

At step 1208, the path on to which to transmit the packet is selected. In a particular embodiment, the path may be selected from a list of paths. The list of paths may include at least a Uu path and a sidelink/PC5 path, according to certain embodiments.

Figure 13:
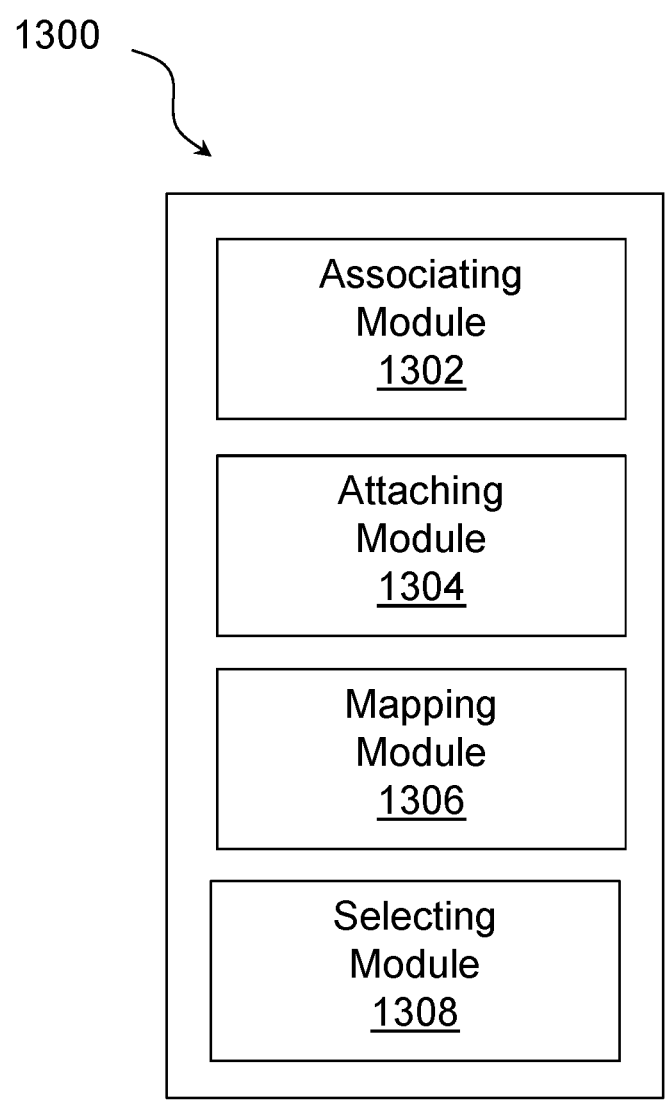
FIG. 13 illustrates an example virtual computing device for QoS differentiation for non-IP based packets transmitted over LTE radio channels, according to certain embodiments.

FIG. 13 illustrates an example virtual computing device 1300 for performing QoS differentiation for non-IP based packets transmitted over LTE radio channels, according to certain embodiments. In certain embodiments, virtual computing device 1300 may include modules for performing steps similar to those described above with regard to the method illustrated and described in FIG. 12. For example, virtual computing device 1300 may include an associating module 1302, an attaching module 1304, a mapping module 1306, a selecting module 1308 and any other suitable modules for performing QoS differentiation for non-IP based packets transmitted over LTE radio channels. In some embodiments, one or more of the modules may be implemented using processor 1130 of FIG. 11. In certain embodiments, the functions of two or more of the various modules may be combined into a single module.

The associating module 1302 may perform the associating functions of virtual computing device 1300. For example, in a particular embodiment, associating module 1302 may associate at least one tag value with a bearer upon establishment of the bearer.

The attaching module 1304 may perform the attaching functions of virtual computing device 1300. For example, in a particular embodiment, attaching module 1304 may attach a tag to a packet when passing the packet to a lower layer.

The mapping module 1306 may perform the mapping functions of virtual computing device 1300. For example, in a particular embodiment, mapping module 1306 may map the packet onto the bearer.

The selecting module 1308 may perform the selecting functions of virtual computing device 1300. For example, in a particular embodiment, selecting module 1308 may select which path to transmit the packet.

Other embodiments of virtual computing device 1300 may include additional components beyond those shown in FIG. 13 that may be responsible for providing certain aspects of the functionality for performing QoS differentiation for non-IP based packets transmitted over LTE radio channels, including any of the functionality described above and/or any additional functionality (including any functionality necessary to support the solutions described above). The various different types of wireless device may include components having the same physical hardware but configured (e.g., via programming) to support different radio access technologies, or may represent partly or entirely different physical components.

Figure 14:
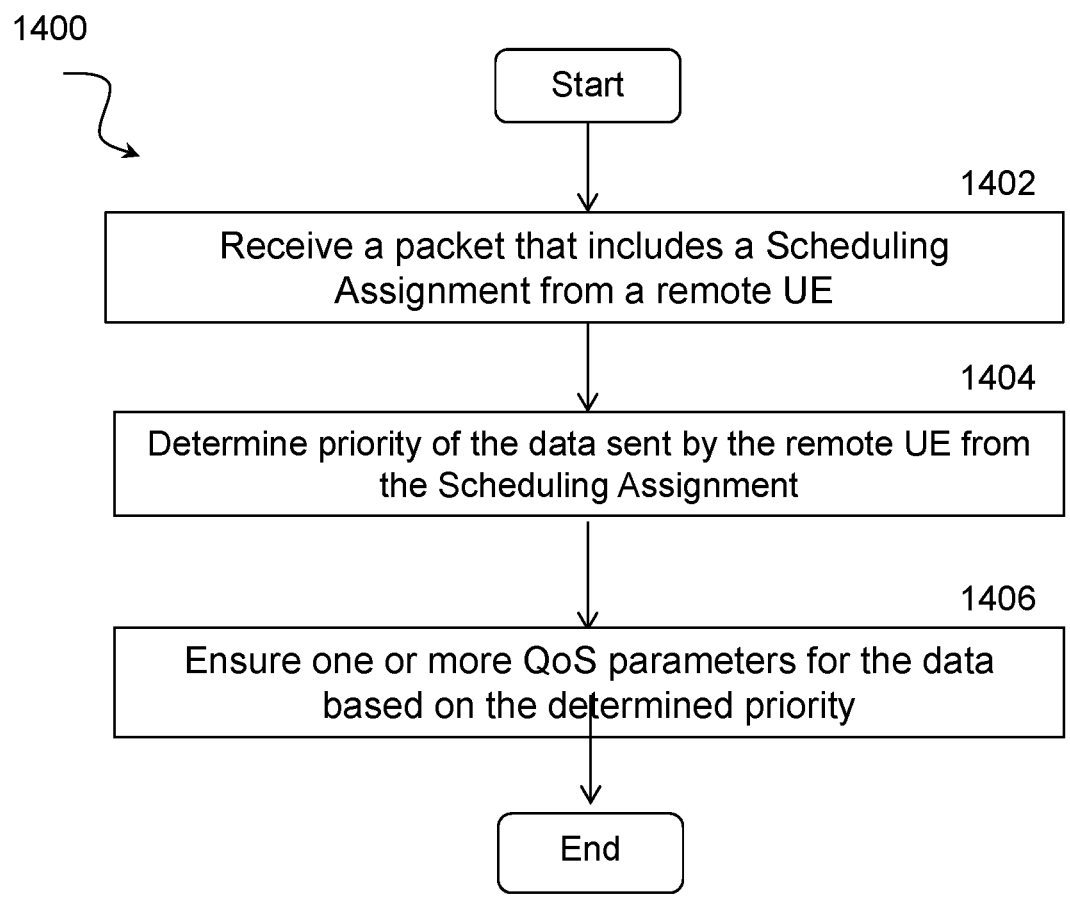
FIG. 14 illustrates another example flow diagram of a method for QoS differentiation for non-IP based packets transmitted over LTE radio channels, according to certain embodiments.

FIG. 14 illustrates another example flow diagram of a method 1400 for QoS differentiation for non-IP based packets transmitted over LTE radio channels by a network node, according to certain embodiments. The method begins at step 1402 when a packet that includes a Scheduling Assignment is received from a remote UE. In a particular embodiment, the Scheduling Assignment includes one or more tags indicative of the priority of the data.

At step 1404, the priority of the data sent by the remote UE is determined from the Scheduling Assignment.

At step 1406, one or more QoS parameters is ensured for the data based on the determined priority.

Figure 15:
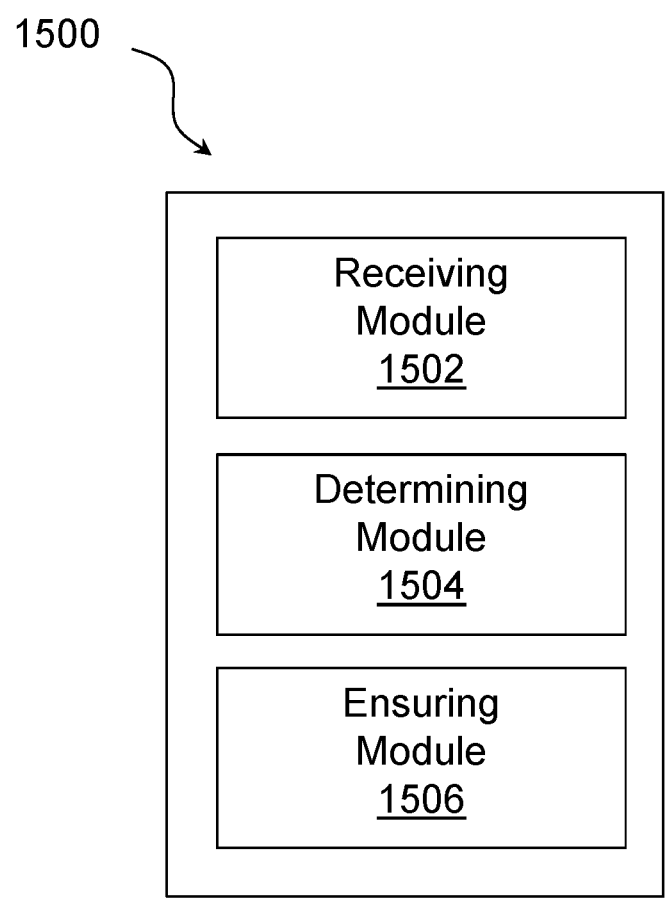
FIG. 15 illustrates another example virtual computing device for QoS differentiation for non-IP based packets transmitted over LTE radio channels, according to certain embodiments.

FIG. 15 illustrates another example virtual computing device 1500 for performing QoS differentiation for non-IP based packets transmitted over LTE radio channels, according to certain embodiments. In certain embodiments, virtual computing device 1500 may include modules for performing steps similar to those described above with regard to the method illustrated and described in FIG. 14. For example, virtual computing device 1500 may include a receiving module 1502, a determining module 1504, an ensuring module 1506, and any other suitable modules for performing QoS differentiation for non-IP based packets transmitted over LTE radio channels. In some embodiments, one or more of the modules may be implemented using processor 1120 of FIG. 11. In certain embodiments, the functions of two or more of the various modules may be combined into a single module.

The receiving module 1502 may perform the receiving functions of virtual computing device 1500. For example, in a particular embodiment, receiving module 1502 may receive a packet that includes a Scheduling Assignment from a remote UE.

The determining module 1504 may perform the determining functions of virtual computing device 1500. For example, in a particular embodiment, determining module 1504 may determine a priority of the data sent by the remote UE from the Scheduling Assignment.

The ensuring module 1506 may perform the ensuring functions of virtual computing device 1500. For example, in a particular embodiment, ensuring module 1506 may ensure that one or more QoS parameters for the data based on the determined priority.

Other embodiments of virtual computing device 1500 may include additional components beyond those shown in FIG. 15 that may be responsible for providing certain aspects of the functionality for performing QoS differentiation for non-IP based packets transmitted over LTE radio channels, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 16:
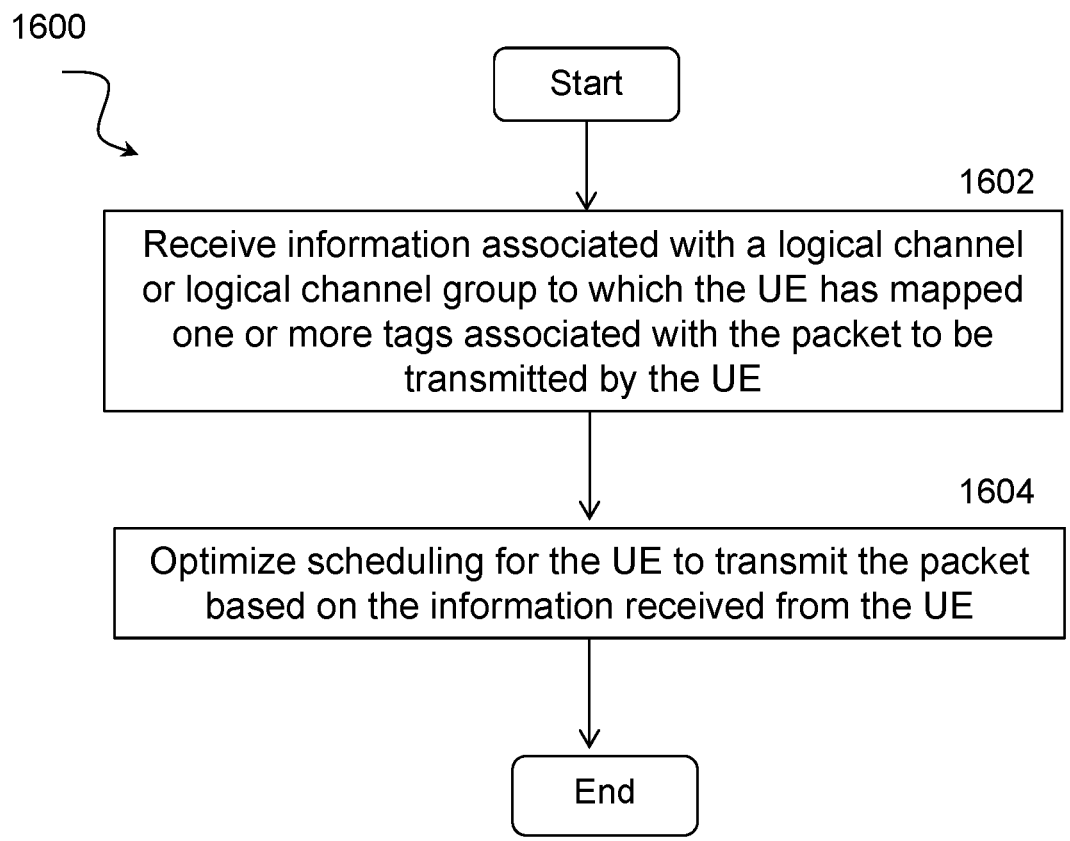
FIG. 16 illustrates another example flow diagram of a method for QoS differentiation for non-IP based packets transmitted over LTE radio channels, according to certain embodiments.

FIG. 16 illustrates another example flow diagram of a method 1600 for QoS differentiation for non-IP based packets transmitted over LTE radio channels by a network node, according to certain embodiments. The method begins at step 1602 when information is received from a UE. The information is associated with a logical channel or logical channel group to which a UE has mapped one or more tags associated with the packet. In a particular embodiment, the information includes a logical channel identity, logical channel group, or the tag. In a particular embodiment, the information may be received in a BSR sent by the UE.

At step 1604, scheduling for the UE to transmit the packet is optimized based on the information received from the UE.

Figure 17:
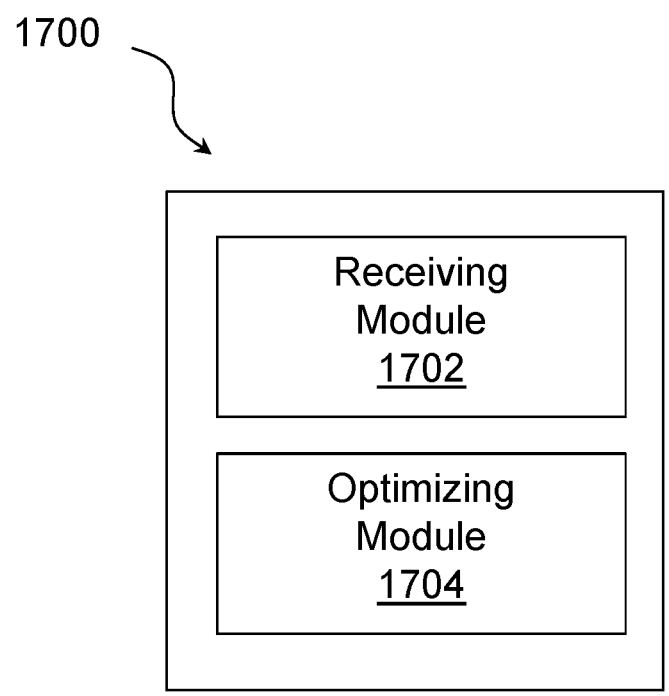
FIG. 17 illustrates another example virtual computing device for QoS differentiation for non-IP based packets transmitted over LTE radio channels, according to certain embodiments.

FIG. 17 illustrates another example virtual computing device 1700 for performing QoS differentiation for non-IP based packets transmitted over LTE radio channels, according to certain embodiments. In certain embodiments, virtual computing device 1700 may include modules for performing steps similar to those described above with regard to the method illustrated and described in FIG. 16. For example, virtual computing device 1700 may include a receiving module 1702, an optimizing module 1704, and any other suitable modules for performing QoS differentiation for non-IP based packets transmitted over LTE radio channels. In some embodiments, one or more of the modules may be implemented using processor 1120 of FIG. 11. In certain embodiments, the functions of two or more of the various modules may be combined into a single module.

The receiving module 1702 may receive information associated with a logic channel or logic channel group from a UE. In certain embodiments, the information may include one or more tags associated with a packet to be transmitted. The tags may be mapped to the logical channel or logical channel group.

The optimizing module 1704 may perform the optimizing functions of virtual computing device 1700. For example, in a particular embodiment, determining module 1704 may optimize scheduling for the UE to transmit the packet based on the information received from the UE.

Other embodiments of virtual computing device 1700 may include additional components beyond those shown in FIG. 17 that may be responsible for providing certain aspects of the functionality for performing QoS differentiation for non-IP based packets transmitted over LTE radio channels, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

According to certain embodiments, a method by a wireless device is provided for mapping of application data packets onto bearers. The method includes associating at least one tag value with a bearer upon establishment of the bearer. A tag is attached to a packet when passing the packet to a lower layer. The packet is mapped onto the bearer, and a path to transmit the packet is selected.

According to certain embodiments, a method for QoS differentiation of data packets using autonomous transmission mode, is provided that includes receiving a packet from a remote UE. The packet comprises a Scheduling Assignment. Priority of data sent by the remote UE is determined from the Scheduling Assignment. One or more QoS parameters is ensured for the data based on the determined priority.

According to certain embodiments, a UE comprises a processor and an interface. The processor and the interface are coupled to one another, and the processor and interface are configured to associate at least one tag value with a bearer upon establishment of the bearer. A tag is attached to a packet when passing the packet to a lower layer. The packet is mapped onto the bearer and a path to transmit the packet is selected.

According to certain embodiments, a UE comprises a processor and an interface. The processor and the interface coupled to one another and configured to receive packet from a remote UE. The packet comprises a Scheduling Assignment. A priority of data sent by the remote UE is determined from the Scheduling Assignment. One or more QoS parameters is ensured for the data based on the determined priority.

According to certain embodiments, a UE comprises logic encoded on a non-transitory computer readable medium that when executed by a processor causes the UE to associate at least one tag value with a bearer upon establishment of the bearer. A tag is attached to a packet when passing the packet to a lower layer. The packet is mapped onto the bearer, and a path to transmit the packet is selected.

According to certain embodiments, a UE comprises logic encoded on a non-transitory computer readable medium that when executed by a processor causes the UE to receive packet from a remote UE. The packet comprises a Scheduling Assignment. Priority of data sent by the remote UE is determined from the Scheduling Assignment. One or more QoS parameters is ensured for the data based on the determined priority.

According to certain embodiments, a UE comprises a plurality of modules. The modules are configured to associate at least one tag value with a bearer upon establishment of the bearer. A tag is attached to a packet when passing the packet to a lower layer. The packet is mapped onto the bearer, and a path to transmit the packet is selected.

According to certain embodiments, a UE comprises a plurality of modules. The modules are configured to receive a packet from a remote UE. The packet comprises a Scheduling Assignment. Priority of data sent by the remote UE is determined from the Scheduling Assignment. One or more QoS parameters for the data is ensured based on the determined priority.

According to certain embodiments, a method for QoS differentiation of data packets using eNB-scheduled transmission mode comprises receiving information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprises a processor and an interface coupled to one another. The processor and interface are configured to receive information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprises logic encoded on a non-transitory computer readable medium that when executed by a processor causes the UE to receive information from a UE. The information is associated with the logical channel or logical channel group to which the UE has mapped one or more tags associated with the packet to be transmitted by the UE. Scheduling for the UE to transmit the packet is optimized based on the information received from the UE.

According to certain embodiments, a network node comprising a plurality of modules, the modules configured to receive information from a UE. The information is associated with the logical channel or logical channel group to which the UE has mapped one or more tags associated with the packet to be transmitted by the UE. Scheduling for the UE to transmit the packet is optimized based on the information received from the UE.

Certain embodiments of the present disclosure may provide one or more technical advantages. For example, certain embodiments may provide QoS differentiation for non-IP data in an EPS network using Uu and PC5 sidelink, as an evolution of the current EPS bearer concept. Another advantage may be that a method for QoS enforcement over the PC5 sidelink interface for LTE D2D communication is provided for IP-based as well as non-IP data. Still another advantage may be that a certain embodiments provide a way to select a path (e.g. Uu, PC5) based on QoS information. For example certain embodiments may provide a way to select either Uu or PC5 based on QoS information.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BSR Buffer Status Report
CAM Cooperative Awareness Message
CIoT Cellular Internet of Things
D2D device-to-device
DENM Decentralized Environmental Notification Message
DSRC Dedicated Short-Range Communication
IP Internet Protocol
ITS Intelligent Transport Systems
MME Mobility Management Entity
V2I Vehicle-to-Infrastructure
V2P Vehicle-to-Pedestrian
V2V Vehicle-to-Vehicle
V2X Vehicle-to-Anything
WAVE Wireless Access in Vehicular Environments
eNB Evolved NodeB
LTE Long Term Evolution
PCRF Policy and Charging Rules Function
PDN Packet Data Network
S-GW Serving Gateway
P-GW PDN Gateway
RRC Radio Resource Control
UE User Equipment
3GPP Third Generation Partnership Project
RSU Road Side Unit
MBMS Multimedia Broadcast Multicast Services
QoS Quality of Service

The invention claimed is:

1. A method for QoS differentiation of data packets using autonomous transmission mode, comprising:
   receiving a packet from a remote UE, the packet comprising a Scheduling Assignment;
   determining priority of data sent by the remote UE from the Scheduling Assignment wherein the Scheduling Assignment comprises one or more tags indicative of the priority of data, wherein the one or more tags are associated with a bearer upon establishment of the bearer, the establishment being triggered by a Vehicle-to-Anything (V2X) application, and wherein the bearer is a non-IP Evolved Packet System (EPS) bearer; and
   based on the determined priority, determining, from a list of paths comprising at least a Uu data radio bearer (DRB) and a sidelink DRB, a path to transmit the packet, wherein two sidelink DRBs are established, a first of the two sidelink DRBs is used when the remote UE uses eNB scheduling and the other sidelink DRB of the two sidelink DRBs is used when the remote UE uses autonomous scheduling.

2. The method of claim 1, wherein the one or more tags are at an application layer.

3. The method of claim 1, wherein one or more QoS parameters are associated with the bearer.

4. A network node comprising a processor and an interface, the processor and the interface coupled to one another, wherein the processor and the interface are configured to:
   receive a packet from a remote UE, the packet comprising a Scheduling Assignment;
   determine priority of data sent by the remote UE from the Scheduling Assignment, wherein the Scheduling Assignment comprises one or more tags indicative of the priority of data, wherein the one or more tags are associated with a bearer upon establishment of the bearer, the establishment being triggered by a Vehicle-to-Anything (V2X) application, and wherein the bearer is a non-IP Evolved Packet System (EPS) bearer; and
   based on the determined priority, determining, from a list of paths comprising at least a Uu data radio bearer (DRB) and a sidelink DRB, a path to transmit the packet, wherein two sidelink DRBs are established, a first of the two sidelink DRBs is used when the remote UE uses eNB scheduling and the other sidelink DRB of the two sidelink DRBs is used when the remote UE uses autonomous scheduling.

5. The network node of claim 4, wherein the one or more tags are at an application layer.

6. The network node of claim 4, wherein one or more QoS parameters are associated with the bearer.

* * * * *